United States Patent
Lorenz et al.

(10) Patent No.: US 12,508,842 B2
(45) Date of Patent: Dec. 30, 2025

(54) MOUNTING ARRANGEMENT OF SELF-SUPPORTING SPOKE STRUCTURE FOR NON-PNEUMATIC TIRE

(71) Applicant: Bridgestone Americas Tire Operations, LLC, Nashville, TN (US)

(72) Inventors: Zachary G. Lorenz, Akron, OH (US); Adam K. Nesbitt, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 18/867,612

(22) PCT Filed: Jun. 5, 2023

(86) PCT No.: PCT/US2023/067908
§ 371 (c)(1),
(2) Date: Nov. 20, 2024

(87) PCT Pub. No.: WO2023/244916
PCT Pub. Date: Nov. 21, 2023

(65) Prior Publication Data
US 2025/0108665 A1    Apr. 3, 2025

Related U.S. Application Data

(60) Provisional application No. 63/353,254, filed on Jun. 17, 2022.

(51) Int. Cl.
*B60C 7/14*    (2006.01)
(52) U.S. Cl.
CPC .................. *B60C 7/146* (2021.08)

(58) Field of Classification Search
CPC ..................................... B60C 7/146
(Continued)

(56) References Cited

U.S. PATENT DOCUMENTS

| | | | | |
|---|---|---|---|---|
| 2009/0033051 A1* | 2/2009 | Ahnert | ............... | B62B 5/00 |
| | | | | 280/47.38 |
| 2011/0126948 A1* | 6/2011 | Boyer | ............... | B60B 9/04 |
| | | | | 152/76 |

(Continued)

FOREIGN PATENT DOCUMENTS

| | | | | |
|---|---|---|---|---|
| CN | 101357565 | | 2/2009 | |
| CN | 201456914 U | * | 5/2010 | ............... B60B 9/02 |

(Continued)

OTHER PUBLICATIONS

JP 2020083244 A Google Patents English Translation 20200604 (Year: 2020).*

(Continued)

*Primary Examiner* — S. Joseph Morano
*Assistant Examiner* — Eva L Comino
(74) *Attorney, Agent, or Firm* — Shaun J. Fox; Bryan J. Jaketic

(57) ABSTRACT

A non-pneumatic tire includes a lower ring having a first diameter and an upper ring having a second diameter. The upper ring is substantially coaxial with the lower ring. A support structure connects the lower ring to the upper ring. The support structure is made up of a plurality of spokes. The support structure is arranged and configured so that adjacent spokes of the plurality of spokes contact one another upon the occurrence of a high impact event.

10 Claims, 22 Drawing Sheets

(58) Field of Classification Search
USPC .............................................................. 152/5
See application file for complete search history.

(56) References Cited

U.S. PATENT DOCUMENTS

| | | | |
|---|---|---|---|
| 2019/0001745 A1* | 1/2019 | Delfino | B60C 7/14 |
| 2020/0282447 A1 | 9/2020 | Delfino et al. | |
| 2021/0129588 A1 | 5/2021 | Baumgartner et al. | |
| 2021/0237511 A1* | 8/2021 | Kujawski | B60B 9/26 |
| 2022/0048325 A1* | 2/2022 | Rimai | B60C 7/18 |

FOREIGN PATENT DOCUMENTS

| | | | | |
|---|---|---|---|---|
| CN | 103068592 | | 4/2013 | |
| CN | 103068592 A | * | 4/2013 | ............ B29D 30/02 |
| CN | 110450577 | | 11/2019 | |
| CN | 111065471 | | 4/2020 | |
| CN | 113165422 | | 7/2021 | |
| CN | 113226790 | | 8/2021 | |
| JP | 2011-025757 | | 2/2011 | |
| JP | 2011025757 A | * | 2/2011 | ............... B60B 9/04 |
| JP | 2015120393 A | * | 7/2015 | ............... B60C 7/18 |
| JP | 2020083244 A | * | 6/2020 | ............ B60C 7/143 |
| JP | 2022029955 | | 2/2022 | |
| JP | 2022516459 | | 2/2022 | |
| WO | WO-2010012091 A1 | * | 2/2010 | ............... B60B 9/26 |
| WO | WO-2019203857 A1 | * | 10/2019 | ............... B60B 9/26 |

OTHER PUBLICATIONS

Written Opinion; Corresponding PCT Application Serial No. PCT/US2023/067908; Authorized Officer Chan Yoon Hwang; Sep. 27, 2023.

International Search Report; Corresponding PCT Application Serial No. PCT/US2023/067908; Authorized Officer Chan Yoon Hwang; Sep. 27, 2023.

* cited by examiner

MOUNTING ARRANGEMENT OF SELF-SUPPORTING SPOKE STRUCTURE FOR NON-PNEUMATIC TIRE

FIELD OF INVENTION

The present disclosure relates to a non-pneumatic tire. More particularly, the present disclosure relates to a non-pneumatic tire having a support structure with spokes that are designed to contact one another during the occurrence of a high impact event.

BACKGROUND

Various tire constructions have been developed that enable a tire to run in an uninflated or underinflated condition. Non-pneumatic tires do not require inflation, while "run flat tires" may continue to operate after being punctured and becoming partially or completely depressurized, for extended periods of time and at relatively high speeds. Non-pneumatic tires may include support structure, such as spokes or webbing, that connects a lower ring to an upper ring. In some non-pneumatic tires, a circumferential tread may be attached to the upper ring of the tire.

The circumferential tread may contain a tread band. The tread band may be a single layer of material or a multi-layer band. Such tread bands may also be referred to as a shear band, a shear element, or a thin annular high strength band element. When used in a non-pneumatic tire, or in a pneumatic tire in a partially pressurized or unpressurized state, the shear element acts as a structural compression member. When used in a fully pressurized pneumatic tire, the shear element acts as a tension member.

Tire design, for both pneumatic and non-pneumatic tires, involves the balancing of many factors including, but not limited to, load capacity, handling, and ride quality. Regardless of the balance that is selected between these factors, non-pneumatic tires must be durable and be able to withstand high impact events, such as hitting a curb, pothole, or other obstruction or road imperfection.

SUMMARY OF THE INVENTION

In one embodiment, a non-pneumatic tire includes a lower ring provided with a plurality of scallops. Each one of the plurality of scallops has a first curved surface. An upper ring is substantially coaxial with the lower ring. A support structure connects the lower ring to the upper ring. The support structure is made up of a plurality of spokes. The plurality of spokes are arranged into a first spoke group and a second spoke group that is axially spaced from the first spoke group. Each one of the plurality of spoke includes a first end connected to the lower ring, and a second end connected to the upper ring. Each one of the plurality of spokes further includes a first surface and a second surface facing opposite the first surface. Each one of the first surface and the second surface extends between the first end and the second end. A foot portion is provided toward the first end of the spoke. The first surface of the spoke at the foot portion is a second curved surface. The second curved surface is attached to the first curved surface of one of the plurality of scallops to connect the first end of the spoke to the lower ring.

In another embodiment, a method of manufacturing a non-pneumatic tire includes providing a lower ring having a first diameter and an upper ring having a second diameter that is greater than the first diameter. A plurality of scallops are formed on the lower ring. Each one of the plurality of scallops has a first curved surface. A plurality of spokes are formed, with each spoke having a first surface and a second surface facing opposite the first surface. The first surface and the second surface each extend between a first end and a second end. Forming the plurality of spokes includes providing a foot portion toward the first end of the spoke. The first surface of the spoke at the foot portion is a second curved surface. The lower ring is connected to the upper ring with the first spoke group and the second spoke group. Connecting the lower ring to the upper ring includes attaching the second curved surface of the spoke at the foot portion to the first curved surface of one of the plurality of scallops to connect the first end of the spoke to the lower ring and connecting the second end of the spoke to the upper ring.

In yet another embodiment, a non-pneumatic tire includes a lower ring having a first radius of curvature. The lower ring is provided with a plurality of scallops. Each scallop has a first curved surface with a second radius of curvature. An upper ring is substantially coaxial with the lower ring. A support structure connects the lower ring to the upper ring. The support structure is made up of a plurality of spokes. Each spoke extends between a first end and a second end, and includes a first surface and a second surface facing opposite the first surface. Each one of the first surface and the second surface extends between the first end and the second end. The spoke is provided with a foot portion toward the first end. The first surface of the spoke at the foot portion is a second curved surface having a third radius of curvature. Each one of the first radius of curvature and the second radius of curvature is different from the third radius of curvature.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
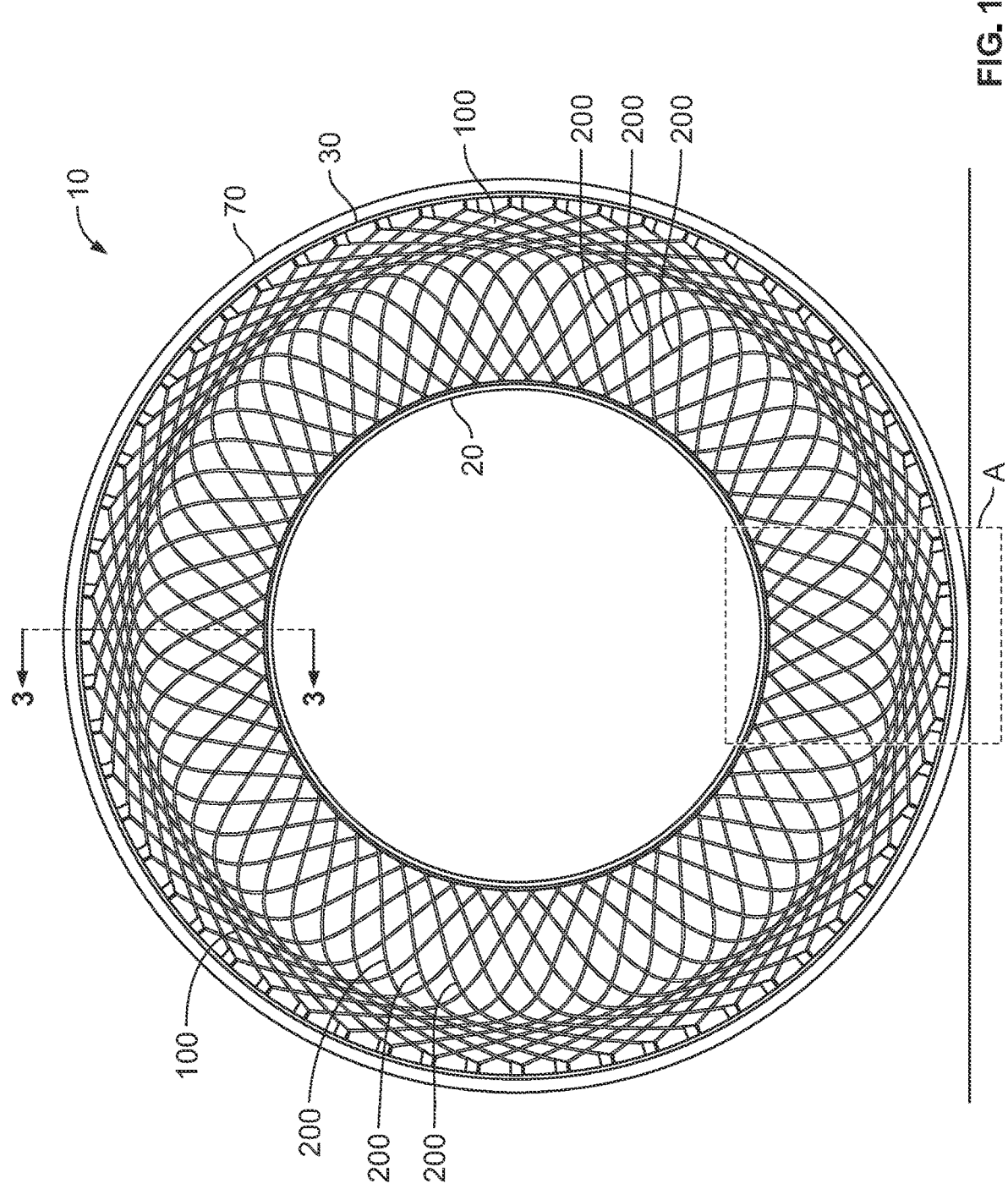
FIG. 1 is a side view of one embodiment of a non-pneumatic tire.
Figure 2:
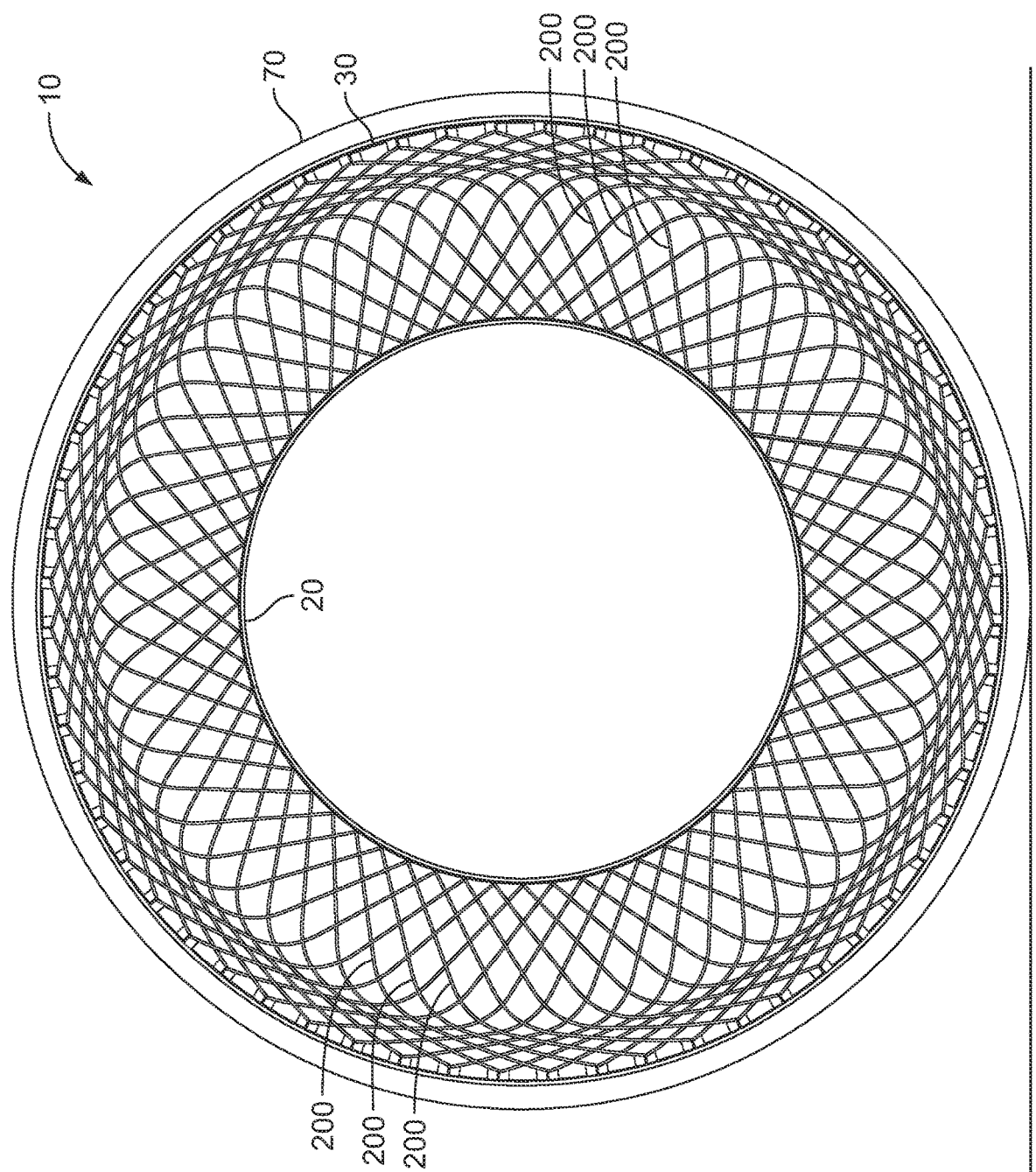
FIG. 2 is another side view of the non-pneumatic tire of FIG. 1.

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Tread" as used herein, refers to that portion of the tire that comes into contact with the road or ground under normal inflation and normal load.

While similar terms used in the following descriptions describe common tire components, it should be understood that because the terms carry slightly different connotations, one of ordinary skill in the art would not consider any one of the following terms to be purely interchangeable with another term used to describe a common tire component.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the side of the tire. Thus, when relative directional terms such as "inner" and "outer" are used in connection with an element, the "inner" element is spaced closer to the equatorial plane of the tire than the "outer" element.

FIGS. 1-5 illustrate one embodiment of a non-pneumatic tire 10. The non-pneumatic tire 10 is merely an exemplary illustration and is not intended to be limiting. In the illustrated embodiment, the non-pneumatic tire 10 includes a generally annular lower ring 20. The lower ring 20 may engage a vehicle hub (not shown) for attaching the tire 10 to a vehicle. The lower ring 20 has an internal surface 23 and an external surface 24, and may be made of a polymeric material, an elastomeric material, a metal, a composite made up of polymers reinforced with glass or carbon fibers, or any other desired material or combination of materials.

The non-pneumatic tire 10 further includes a generally annular upper ring 30. The upper ring 30 has a diameter that is greater than a diameter of the lower ring 20, and is substantially coaxial with the lower ring 20. The upper ring 30 has an internal surface 33 and an external surface 34, and may be made out of a polymeric material, an elastomeric material, a metal, a composite made up of polymers reinforced with glass or carbon fibers, or any other desired material or combination of materials. A circumferential tread 70 is attached to the external surface 34 of the upper ring 30. The circumferential tread 70 may be attached to the upper ring 30 adhesively, mechanically, or by any other desired arrangement.

Figure 3:
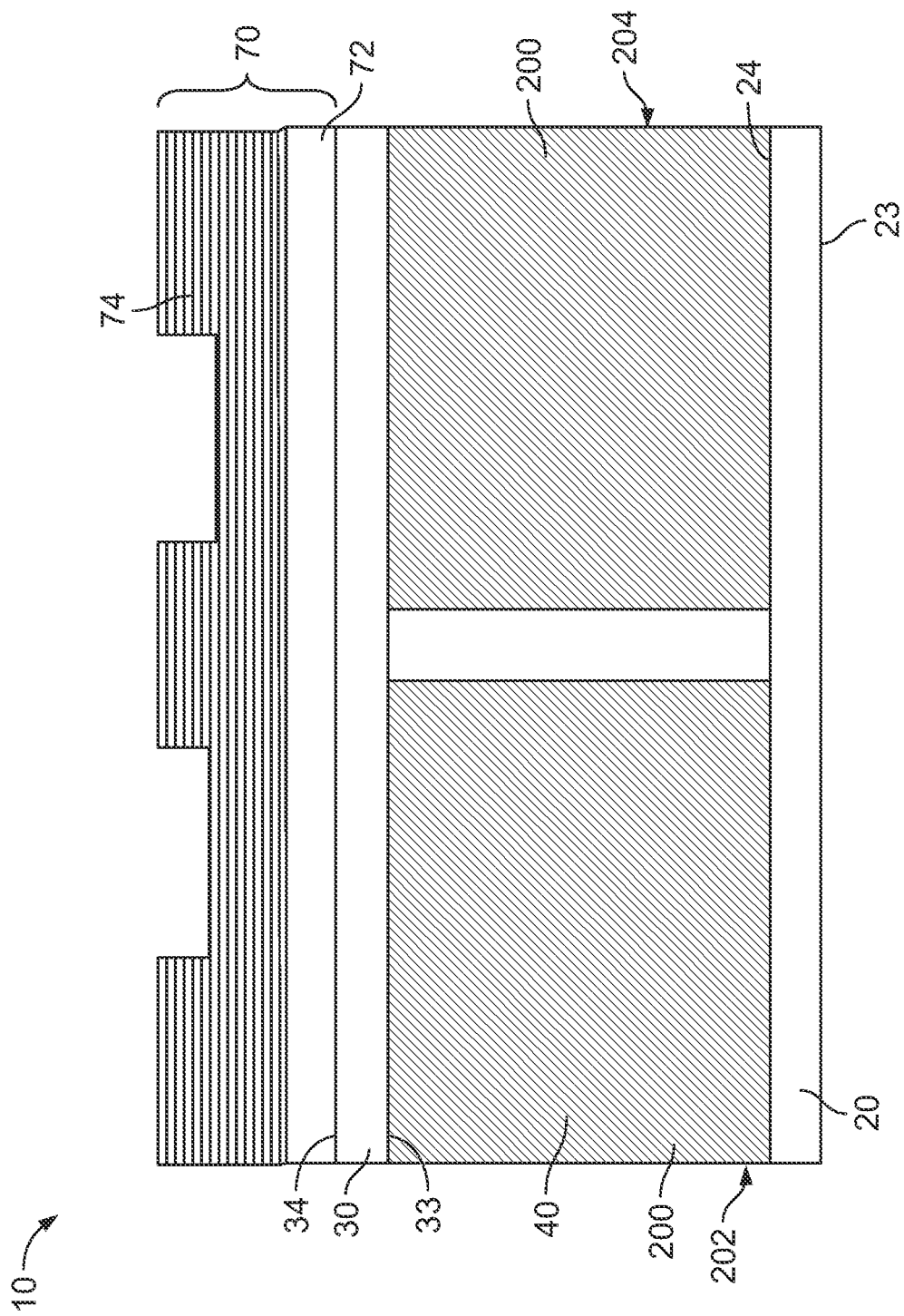
FIG. 3 is a sectional view along 3-3 of FIG. 1.
Figure 4:
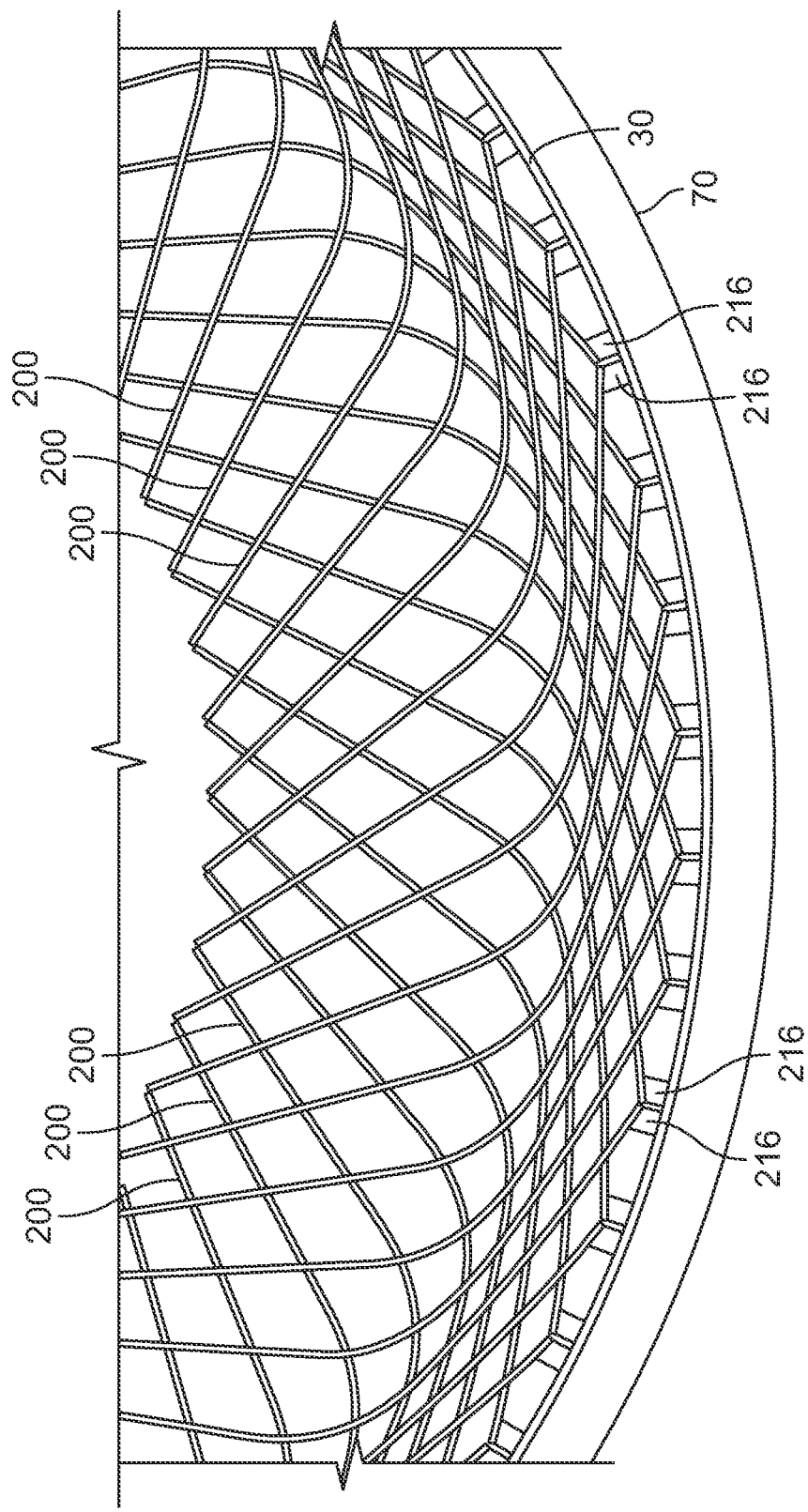
FIG. 4 is a detail view of Area A of FIG. 1.
Figure 5:
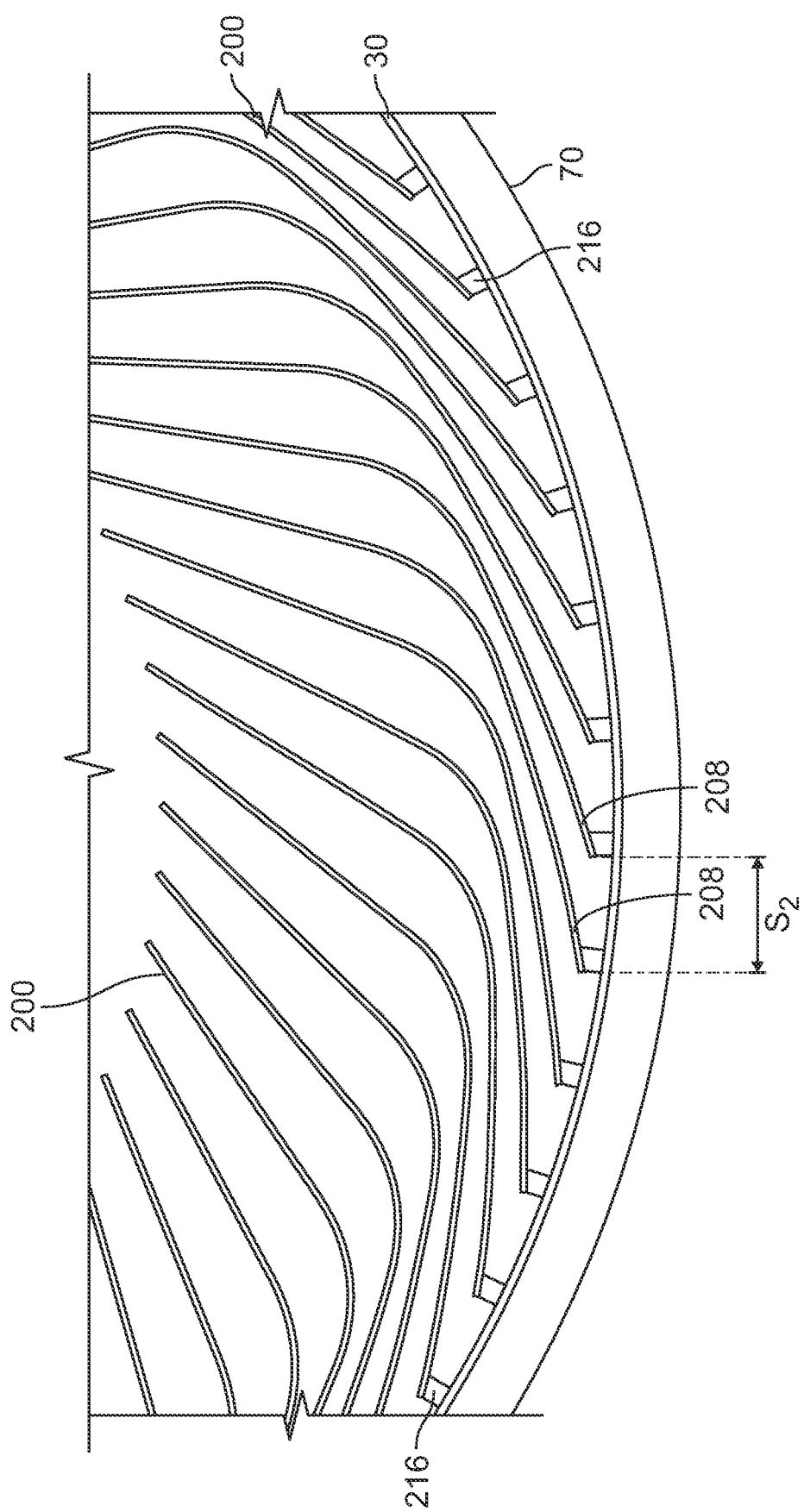
FIG. 5 is a detail view of Area A of FIG. 1 with some features removed for clarity.

As shown in FIG. 3, the circumferential tread 70 includes a tread band 72 and a tread layer 74. The tread band 72 and the tread layer 74 may be made of out of the same material or different material. The tread layer 74 may be made out of rubber, and may include tread elements (not shown) such as grooves, ribs, blocks, lugs, sipes, studs, or any other desired tread elements. The tread band may include a filament assembly.

In the illustrated embodiment, the tread band 72 is shown as a single layer. In alternative embodiments, the tread band may be a multi-layer band. Such multi-layer tread bands may include one or more layers of substantially inextensible material. The layers may be formed of sheets of material, cords of material, filaments of material, or any other desired arrangement. In other alternative embodiments, the multi-layer tread band may include a layer of extensible material, such as an elastomer. According to one example embodiment, the tread band may include a pair of inextensible layers separated by a layer of extensible material. In still other alternative embodiments, the tread band may include bands that are referred to as shear bands, shear elements, or thin annular high strength band elements.

Support structure 100 connects the lower ring 20 to the upper ring 30. The support structure 100 extends from the external surface 24 of the lower ring 20 and the internal surface 33 of the upper ring 30. The support structure 100 is made up of a plurality of spokes 200. In the illustrated embodiment, the plurality of spokes 200 are arranged into two axially spaced spoke groups, including a first spoke group 202 and a second spoke group 204 axially spaced from the first spoke group 202. In alternative embodiments, the support structure may include more than two axially spaced spoke groups.

As shown in FIG. 3, the first spoke group 202 and the second spoke group 204 spaced apart from one another in the axial direction. In alternative embodiments, the space between the first spoke group and the second spoke group may be larger or smaller, or the first and second spoke groups may be arranged with no space therebetween. When viewed from the perspective shown in FIG. 1, each spoke 200 of the first spoke group 202 is substantially convex relative to a clockwise circumferential direction of the non-pneumatic tire 10, and each spoke of the second spoke group 204 is substantially concave relative to the clockwise circumferential direction of the non-pneumatic tire 10.

Figure 6:
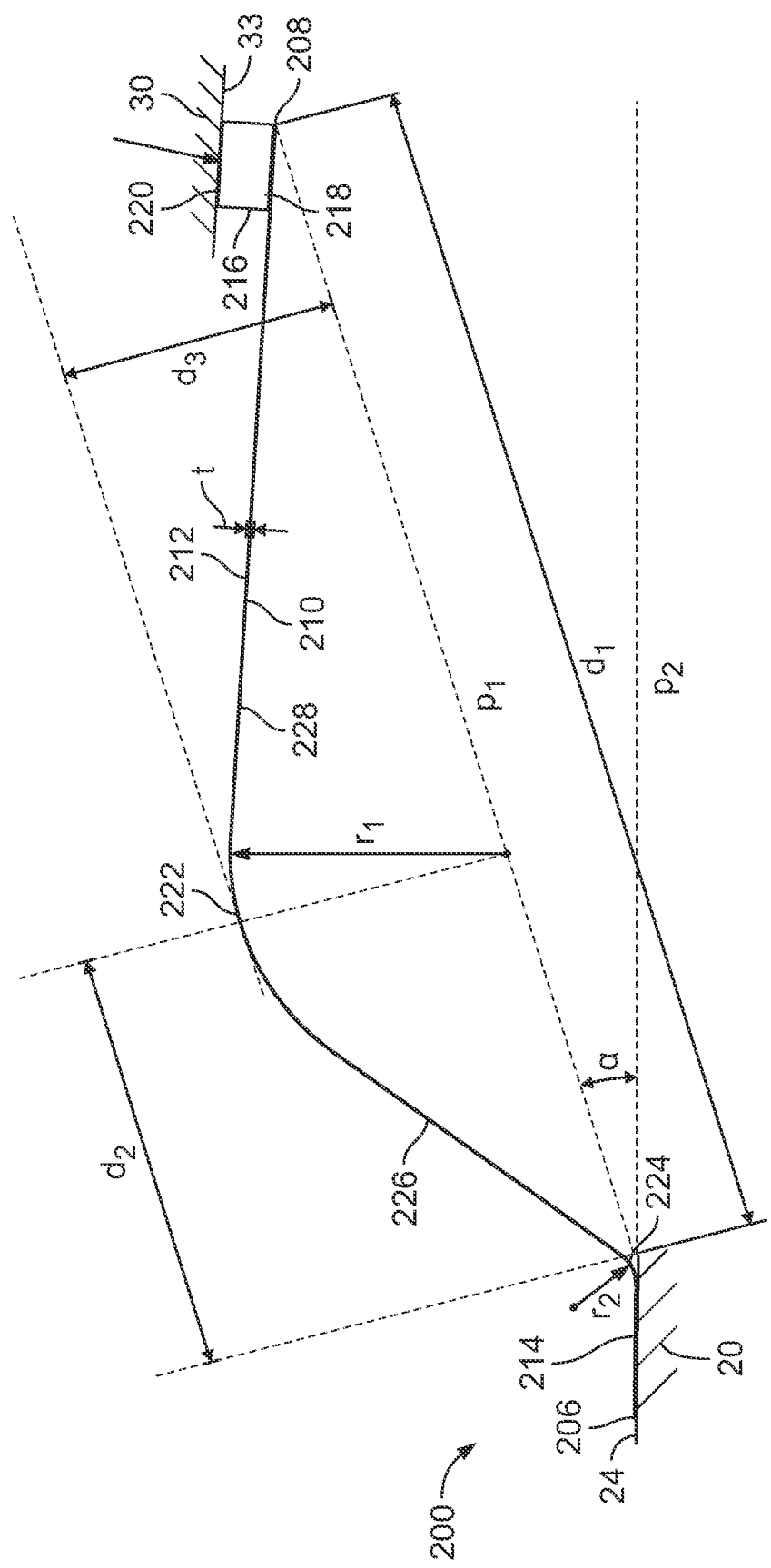
FIG. 6 is a detail view of a single spoke that is used in the non-pneumatic tire of FIG. 1.

All of the spokes 200 of the first and second spoke groups 202, 204 have the same configuration. Accordingly, the description of the spokes 200 will be made with reference to the single spoke 200 shown in FIG. 6. The spoke 200 may be manufactured out of metals such as steel or aluminum, polymers such as polyester or nylon, composites such as fiberglass or carbon fiber reinforced polymers, or any other desired material or combination of materials. The spoke 200 may be provided with reinforcements (not shown).

The spoke 200 extends between a first end 206 and a second end 208, and has a substantially rectangular cross section that includes a first surface 210 and a second surface 212 facing opposite the first surface 210. A spoke thickness t refers to the distance between the first and second surfaces 210, 212. In the illustrated embodiment, the spoke 200 has a constant thickness between the first end 206 and the second end 208. In alternative embodiments, the thickness of the spoke may vary between the first and second ends. For example, the spoke may have relatively thicker portions at the first and second ends and a relatively thinner portion between the ends. In other alternative embodiments, the spoke may have any desired cross section shape (e.g., circle, diamond, hexagon, etc.) or may have a combination of different cross section shapes.

An integral foot portion 214 is provided toward the first end 206 of the spoke 200. The first surface 210 of the spoke 200 at the foot portion 214 is attached to the external surface 24 of the lower ring 20 to connect the first end 206 of the spoke 200 to the lower ring 20. The foot portion 214 may be attached to the external surface 24 of the lower ring 20 using welding, brazing, soldering, adhesives, mechanical fasteners (e.g., bolts, rivets), key/keyway, or any other desired arrangement. In the illustrated embodiment, the foot portion 214 is substantially straight, and the entire length (dimension of the foot portion extending along the circumferential direction of the tire) and the entire width (dimension of the foot portion extending along the axial direction of the tire) is secured to the external surface 24 of the lower ring 20. In alternative embodiments, the foot portion may be a separate component that is attached to the spoke. In other alternative embodiments, the foot portion may be curved to match the radius of curvature of the external surface of the lower ring or have any other desired curvature. In still other alternative embodiments, only a part or multiple discrete parts of the foot portion may be attached to the external surface of the lower ring. In still yet other alternative embodiments, the foot portion may be attached below the external surface of the lower ring, or the spoke may extend through the lower ring so that the foot portion can be attached to the internal surface of the lower ring.

A flexure member 216 is provided at the second end 208 of the spoke 200. The flexure member 216 has a width that extends along the axial direction of the tire. The flexure member 216 may be manufactured out of a polymer (e.g., urethane or rubber), a thin, curved piece of metal, or any other desired material or combination of materials. In the illustrated embodiment, the flexure member 216 is provided as a rectangular cuboid and arranged so that an end of the flexure member 216 is aligned with the second end 208 of the spoke 200. In other alternative embodiments, the flexure member may be arranged so that an end of the flexure member is set back from the second end of the spoke, or may be arranged so that an end of the flexure member extends beyond the second end of the spoke. In still yet other alternative embodiments, the flexure member may be replaced with a mechanical pinned joint (i.e., hinge).

The flexure member 216 includes a spoke facing surface 218 and a ring facing surface 220. The spoke facing 218 surface of the flexure member 216 is attached to the second surface 212 of the spoke 200 and the ring facing surface 220 is attached to the internal surface 33 of the upper ring 30 to connect the second end 208 of the spoke 200 to the upper ring 30. The attachment between the flexure member 216 and the spoke 200 or between the flexure member 216 and the upper ring 30 may be achieved using welding, brazing, soldering, adhesives, mechanical fasteners (e.g., bolts, rivets), key/keyway, or any other desired arrangement. For example, the attachment may be provided by casting urethane directly against the spoke, with or without the spoke being first coated in a primer.

The flexure member 216 provides flexibility to the connection between the second end 208 of the spoke 200 and the upper ring 30. This flexibility decreases the chances of high stresses being generated within the spoke 200, thereby improving the robustness of the non-pneumatic tire 10. In comparison to the flexible connection provided by the flexure member 216, the connection provided by the foot portion 214 at the first end 206 of the spoke 200 is more rigid.

In alternative embodiments, the flexure member may have a shape or configuration that is different from what is specifically shown and described. In other alternative embodiments, additional structure(s) or mechanism(s) may supplement the flexure member to attach the second end of the spoke to the upper ring. In still other alternative embodiments, the flexure member may be omitted and the second end of the spoke may be directly attached to the upper ring. In these alternative embodiments, the second end of the spoke may be attached directly to the internal surface of the upper ring, above the internal surface of the upper ring, or the spoke may extend through the upper ring so that the second end can be attached to the external surface of the upper ring.

The spoke 200 includes a knee portion 222 between the first end 206 and the second end 208. The knee portion 222 has a first radius of curvature $r_1$. According to one example embodiment, the first radius of curvature $r_1$ is 2-6 inches (5-15 cm). When attached to the upper and lower rings 20, 30, the knee portion 222 is concavely curved relative to the lower ring 20.

A transition portion 224 is provided between the knee portion 222 and the first end 206. The transition portion 224 has a second radius of curvature $r_2$. According to one example embodiment, the second radius of curvature $r_2$ is 0-2 inches (0-5 cm). When attached to the upper and lower rings 20, 30, the transition portion 224 is convexly curved relative to the lower ring 20. Thus, relative to a single spoke 200, the knee portion 222 and the transition portion 224 are concavely curved in opposite facing directions. In alternative embodiments, the knee portion and the transition portion are concavely (or convexly) curved in the same direction.

The foot portion 214 extends from the transition portion 224 to the first end 206 of the spoke 200. A first connecting portion 226 connects the transition portion 224 to the knee portion 222, and a second connecting portion 228 connects the knee portion 222 to the second end 208 of the spoke 200. In the illustrated embodiment, the first and second connecting portions 226, 228 are both linear. In alternative embodiments, the first connecting portion or the second connecting portion may be curved or have any other desired configuration. In other alternative embodiments, the transition portion and the foot portion may be omitted. In such alternative embodiments, the first end of the spoke would be located at the end of the first connecting portion.

A base plane $p_1$ intersects the transition portion 224 and the second end 208 of the spoke 200, and serves as a reference for various dimensional aspects of the spoke 200. The angle between the base plane $p_1$ and a second plane $p_2$ extending tangentially to the external surface 24 of the lower ring 20 at the transition portion 224 is α. According to one example embodiment, the angle α is +0-20 degrees. The distance between the transition portion 224 and the second end 208 of the spoke 200 along a direction parallel to the base plane $p_1$ is $d_1$. According to one example embodiment, the distance $d_1$ is 10-25 inches (25-63.5 cm). The distance between a center of the transition portion 224 and the center of the first radius of curvature $r_1$ of the knee portion 222 along a direction parallel to the base plane $p_1$ is $d_2$. According to one example embodiment, the value of the distance $d_2$ is 20-70 percent of the distance $d_1$. The maximum distance between the knee portion 222 and the base plane $p_1$ along a direction perpendicular to the base plane $p_1$ is $d_3$. According to one example embodiment, the distance $d_3$ is 2-4 inches (5-10 cm).

Figure 10:
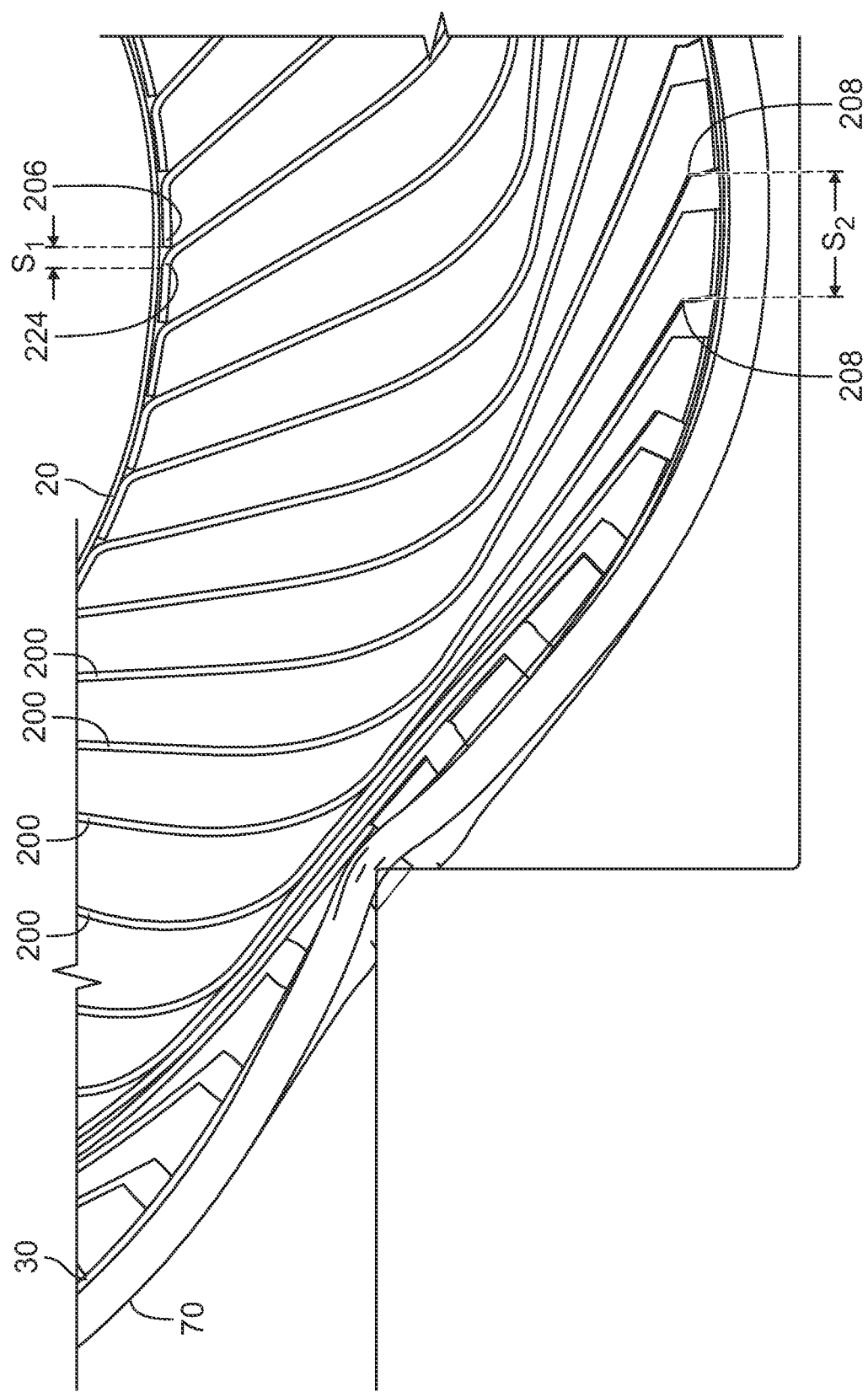
FIG. 10 is a side view of part of the non-pneumatic tire of FIG. 1 when the tire is on an uneven surface, with some features removed for clarity.

Referring to FIG. 10, the transition portion 224 of one spoke 200 is separated from the first end 206 of an adjacent spoke 200 by a first spacing distance $s_1$. The second end 208 of adjacent spokes 200 are separated from one another by a second spacing distance $s_2$ (see also FIG. 5).

Figure 7:
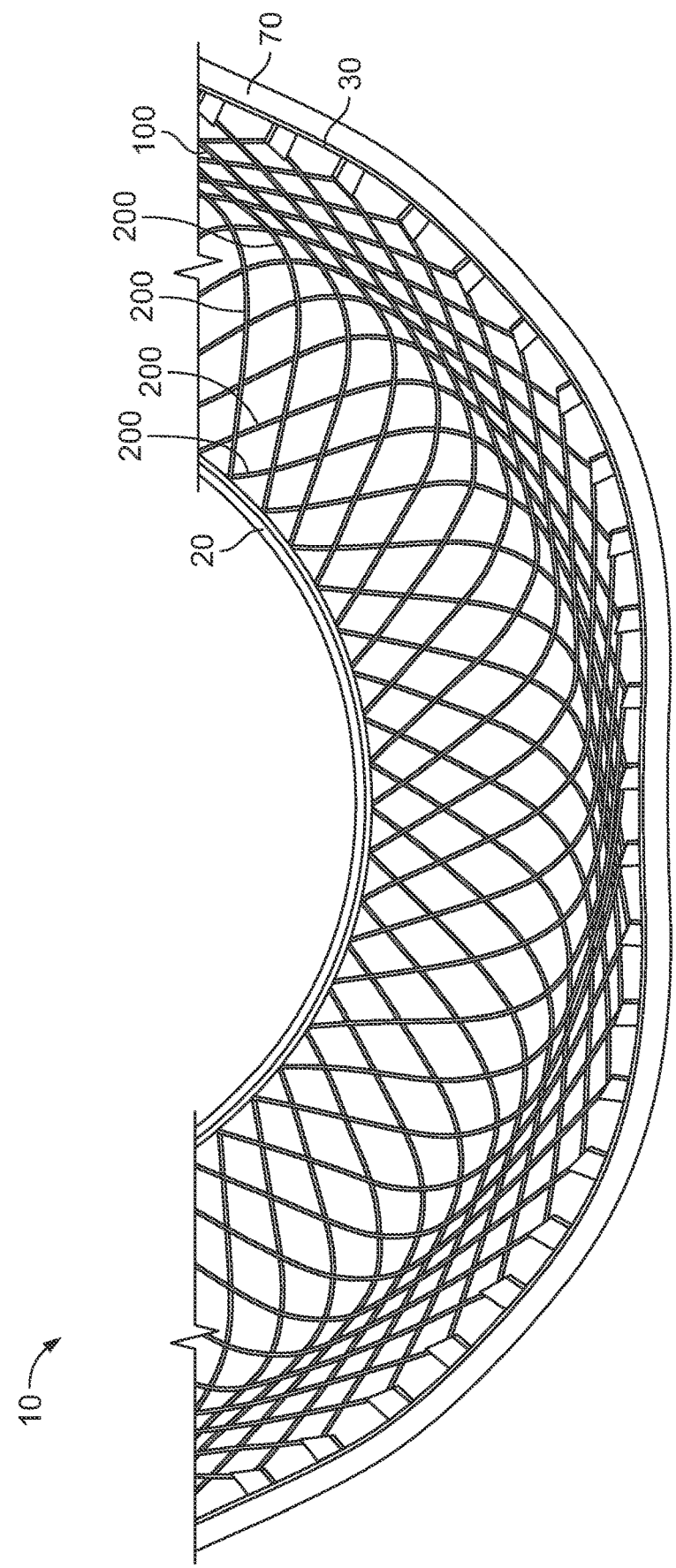
FIG. 7 is a side view of part of the non-pneumatic tire of FIG. 1 when the tire is on a flat surface and carrying a normal load.
Figure 8:
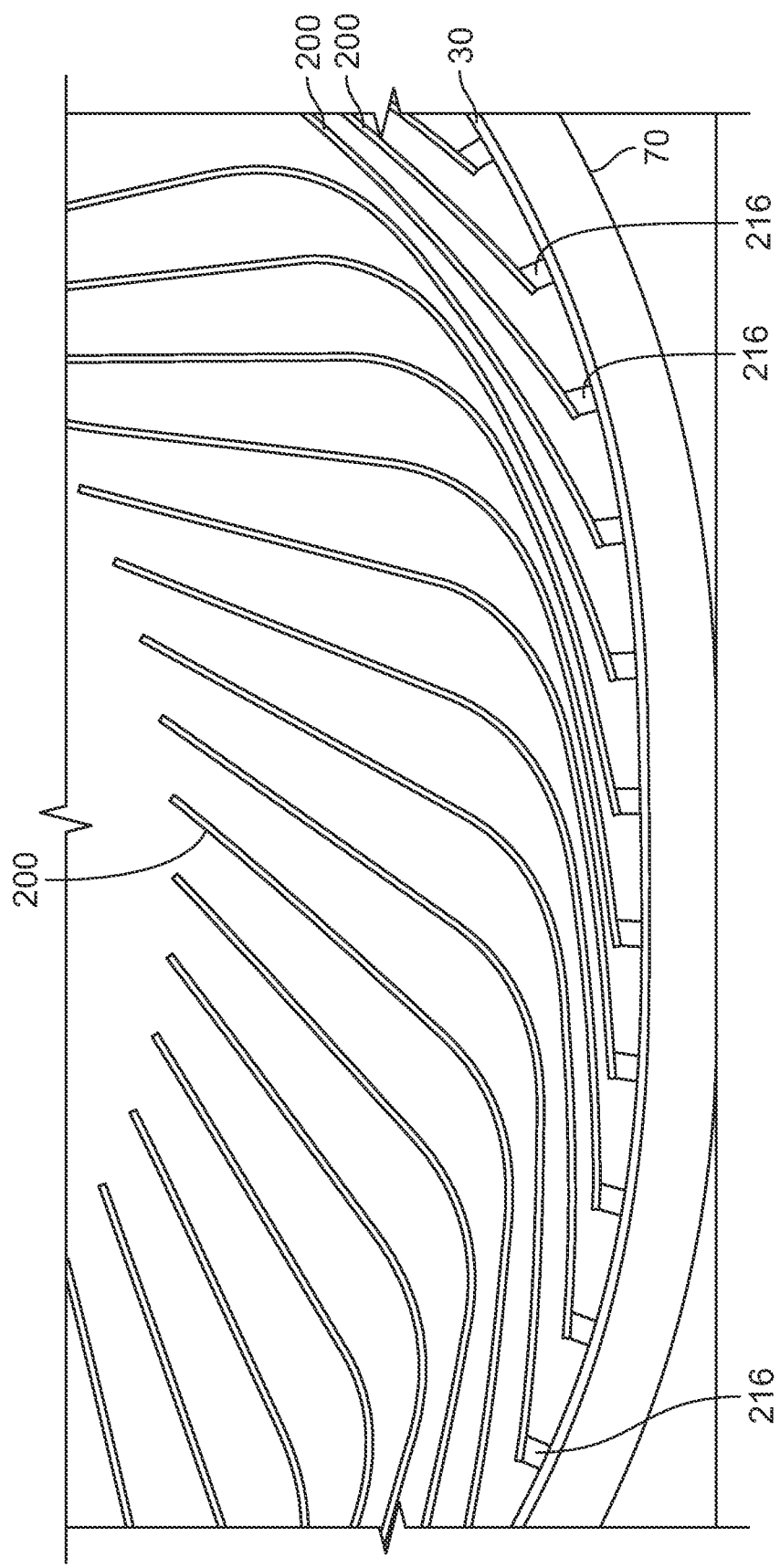
FIG. 8 is a side view of part of the non-pneumatic tire of FIG. 1 when the tire is on a flat surface and carrying a normal load, with some features removed for clarity.

A non-pneumatic tire constructed in accordance with the above described design parameters may provide a more robust assembly, especially in terms of impact performance. FIGS. 7 and 8 shows the tire in an exemplary first condition. As shown FIGS. 7 and 8, according to a non-limiting example, in the first condition the tire 10 is rolling on a flat surface while carrying a load (i.e., normal operation), the non-pneumatic tire 10 deforms, but adjacent spokes 200 are not in contact with one another. The lack of contact between adjacent spokes 200 during normal operation is desirable to avoid the creation of unnecessary stresses in the structure of the non-pneumatic tire 10.

It is expected that the non-pneumatic tire 10 will be exposed to a high impact event during its lifetime, such as hitting a curb, pothole, or other obstruction or road imperfection. During a high impact event, the non-pneumatic tire 10 may deform at significantly higher levels than the deformation that occurs during normal operation. One example of a high impact event is the non-pneumatic tire 10 striking a curb at a low speed (e.g., 6 inch (15 centimeter) curb at 5 miles per hour (8 kilometers per hour)). Another example of a high impact event is the non-pneumatic tire 10 striking a step-up road imperfection at a high speed (e.g., 1 inch (2.5 centimeter) step-up at 70 miles per hour (113 kilometers per hour)). These are merely examples and are not meant to limit the definition of "high impact event."

Figure 9:
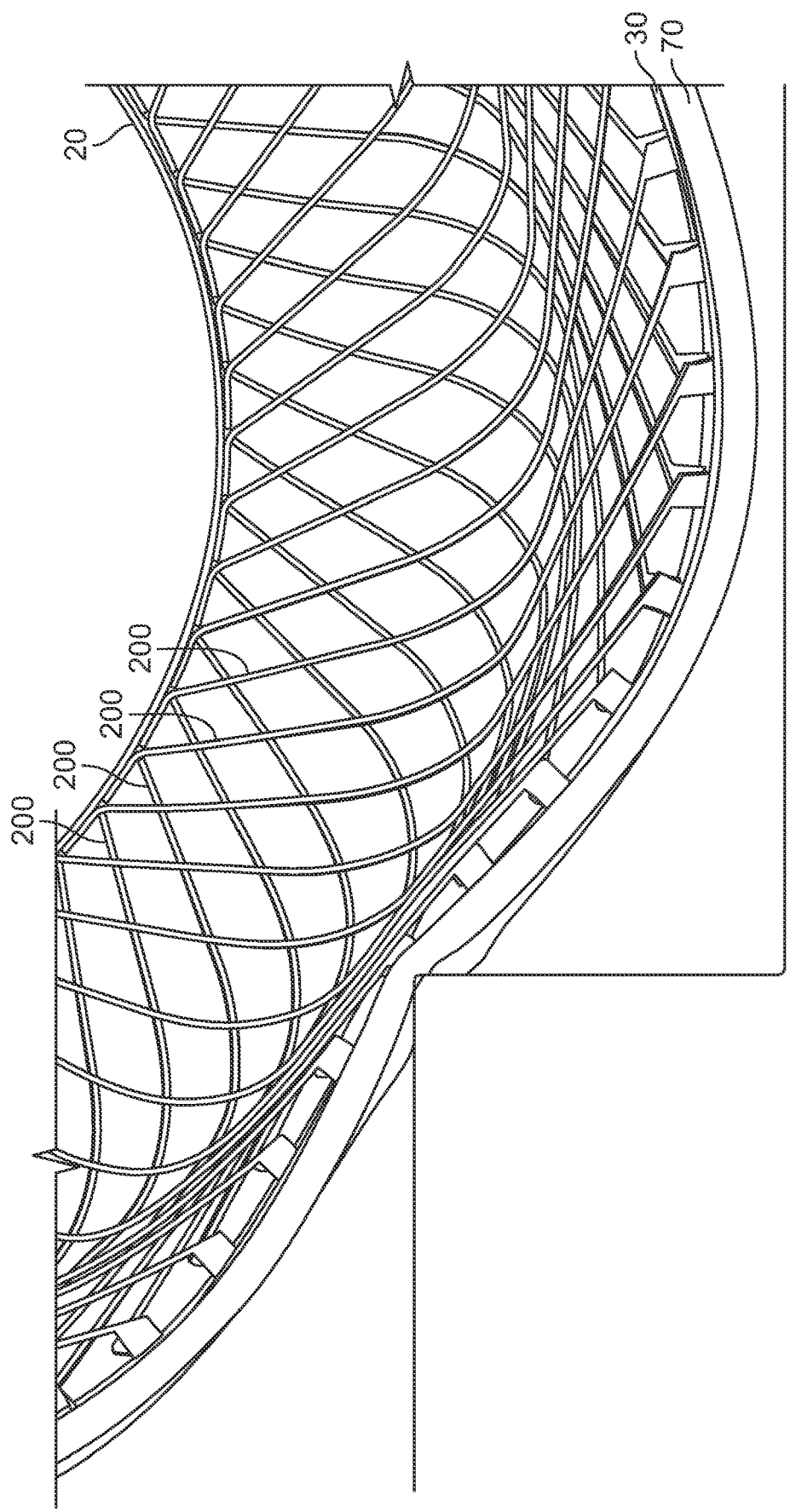
FIG. 9 is a side view of part of the non-pneumatic tire of FIG. 1 when the tire is on an uneven surface.

FIGS. 9 and 10 show the tire in an exemplary second condition, the second condition being different from the first condition. As shown in FIGS. 9 and 10, according to a non-limiting example, in the second condition the non-pneumatic tire 10 experiences a high impact event, in which the tire rolls over an uneven surface. According to one non-limiting example, the uneven surface is a road imperfection that protrudes above the ground, or depresses into the ground, a distance of 3 inches (8 cm). According to another non-limiting example, the uneven surface is a road imperfection that protrudes above the ground, or depresses into the ground, a distance of 4.5 inches (11 cm). According to yet another non-limiting example, the uneven surface is a road imperfection that protrudes above the ground, or depresses into the ground, a distance of 6 inches (15 cm).

The non-pneumatic tire 10 responds to the high impact event by deforming so that adjacent spokes 200 contact one another. It has been found that, surprisingly, the contact between adjacent spokes 200 during a high impact event significantly lowers the stress experienced by an individual spoke 200 compared to a non-pneumatic tire where spokes do not contact one another during a high impact event. The reduction of stress in an individual spoke 200 is a result of the contact between the adjacent spokes 200, as the contact distributes the load among multiple spokes 200. In other words, rather than a single spoke 200 absorbing the load arising from the high impact event, multiple spokes 200 share the same load, thus reducing the peak load of any one single spoke 200.

In the illustrated embodiment, the non-pneumatic tire 10 is arranged and configured so that at least three adjacent spokes 200 are in simultaneous contact with one another during a high impact event, and the spokes 200 in contact with one another are located adjacent to the obstruction or road imperfection responsible for the high impact event. In alternative embodiments, the non-pneumatic tire may be arranged and configured to have a fewer or greater number of adjacent spokes in simultaneous contact with one another during a high impact event. In other alternative embodiments, the adjacent spokes in simultaneous contact with one another may be located at any location along the circumferential direction of the tire (i.e., spaced away from the obstruction or road imperfection responsible for the high impact event).

Design parameters of the spokes 200 and other components of the non-pneumatic tire 10 may be altered to provide the non-pneumatic tire 10 with desired performance characteristics. Preferably, these design parameters are selected so that contact between adjacent spokes 200 occurs before the spoke 200 begins to yield or experience any other forms of damage.

The maximum distance $d_3$ between the knee portion 222 and the base plane $p_1$ along a direction perpendicular to the base plane $p_1$, affects spoke stiffness and when contact between adjacent spokes 200 will occur. Increasing the distance $d_3$ will physically move each spoke 200 closer to adjacent spokes 200, thus causing contact between adjacent spokes 200 to occur relatively sooner. Additionally, increasing the distance da will decrease the stiffness of the spoke 200, thus increasing the amount deflection for a given load, which increases the likelihood of contact between adjacent spokes 200. Decreasing the distance $d_3$ will have an opposite effect, and will physically move each spoke 200 farther from adjacent spokes 200, thus causing contact between adjacent spokes 200 to occur relatively later. Additionally, decreasing the distance da will increase the stiffness of the spoke 200, thus decreasing the amount of deflection for a given load, which decreases the likelihood of contact between adjacent spokes 200.

The distance $d_2$ between the transition portion 224 and the center of the first radius of curvature $r_1$ of the knee portion 222 along a direction parallel to the base plane $p_1$, affects when contact with adjacent spokes 200 will occur. When the distance $d_2$ is a greater percentage of $d_1$, this will result in contact between adjacent spokes 200 occurring relatively sooner. When the distance $d_2$ is a smaller percentage of $d_1$, this will result in contact between adjacent spokes 200 occurring relatively later.

The radius of curvature $r_1$ of the knee portion 222, affects when contact with adjacent spokes 200 will occur. Decreasing the radius of curvature $r_1$ will result in contact between adjacent spokes 200 occurring relatively later, while increasing the radius of curvature $r_1$ will result in contact between adjacent spokes 200 occurring relatively sooner. The spoke thickness t affects the stiffness of the spoke 200. Increasing spoke thickness t will increase the stiffness of the spoke 200, while decreasing spoke thickness will decreases the stiffness of the spoke 200.

Additionally, it has been found that vertical stiffness of the tire is affected by the combination of spoke thickness t and the distance $d_3$. Increasing the distance $d_3$ decreases tire stiffness, while decreasing the distance $d_3$ increases tire stiffness. Consequently, it has been found that, in order to meet a targeted value of tire stiffness, a spoke with a larger thickness t should be combined with a larger distance $d_3$, while a spoke with a smaller thickness t should be combined with a smaller distance $d_3$.

Figure 11:
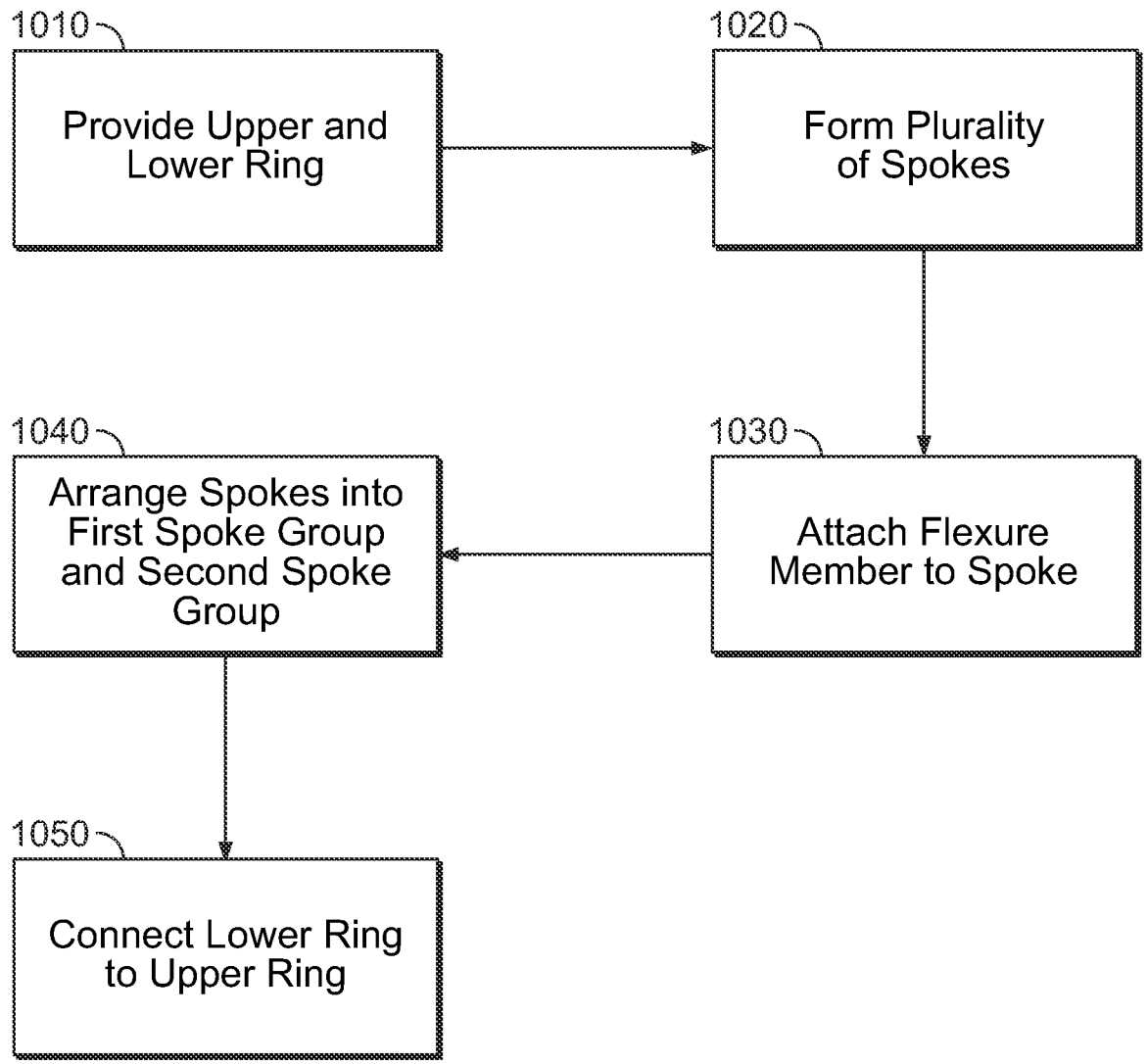
FIG. 11 is a flow chart showing a method of manufacturing the non-pneumatic tire of FIG. 1.

FIG. 11 is a flow chart showing an exemplary method of manufacturing a non-pneumatic tire. At 1010, a lower ring and an upper ring are provided. The lower ring has a first diameter and the upper ring has a second diameter that is greater than the first diameter. At 1020, a plurality of spokes are formed. The spokes may be formed using hot stamping, cold forming, extruding, rolling, bending, or any other desired method. Additionally, the spokes may be formed using multiple composite fabrication techniques (e.g., resin transfer molding and high pressure resin transfer molding). Further examples of methods for forming the spokes include wet lay-up, prepreg lamination. Each spoke extends between a first end and a second end. A knee portion is located between the first end and the second end, and a transition portion is located between the first end and the knee portion. The knee portion and the transition portion are concavely curved in opposite facing directions. A foot portion extends from the transition portion.

At 1030, a flexure member is attached to the spoke. At 1040, the spokes are arranged into a first spoke group and a second spoke group that is axially spaced from the first spoke group. Furthermore, the plurality of spokes of the first spoke group are arranged to be concavely curved relative to a first circumferential direction of the tire, and the plurality of spokes of the second spoke group are arranged to be convexly curved relative to the first circumferential direction of the tire.

At 1050, the lower ring is connected to the upper ring using the first spoke group and the second spoke group. The foot portion of each of the spokes is attached to the lower ring to connect the first end of each spoke to the lower ring. The flexure member is attached to the upper ring to connect the second end of each spoke to the upper ring.

In alternative embodiments, the foregoing steps may occur in an order other than what is specifically described. In other alternative embodiments, the method may include a greater or fewer number of steps.

Figure 12:
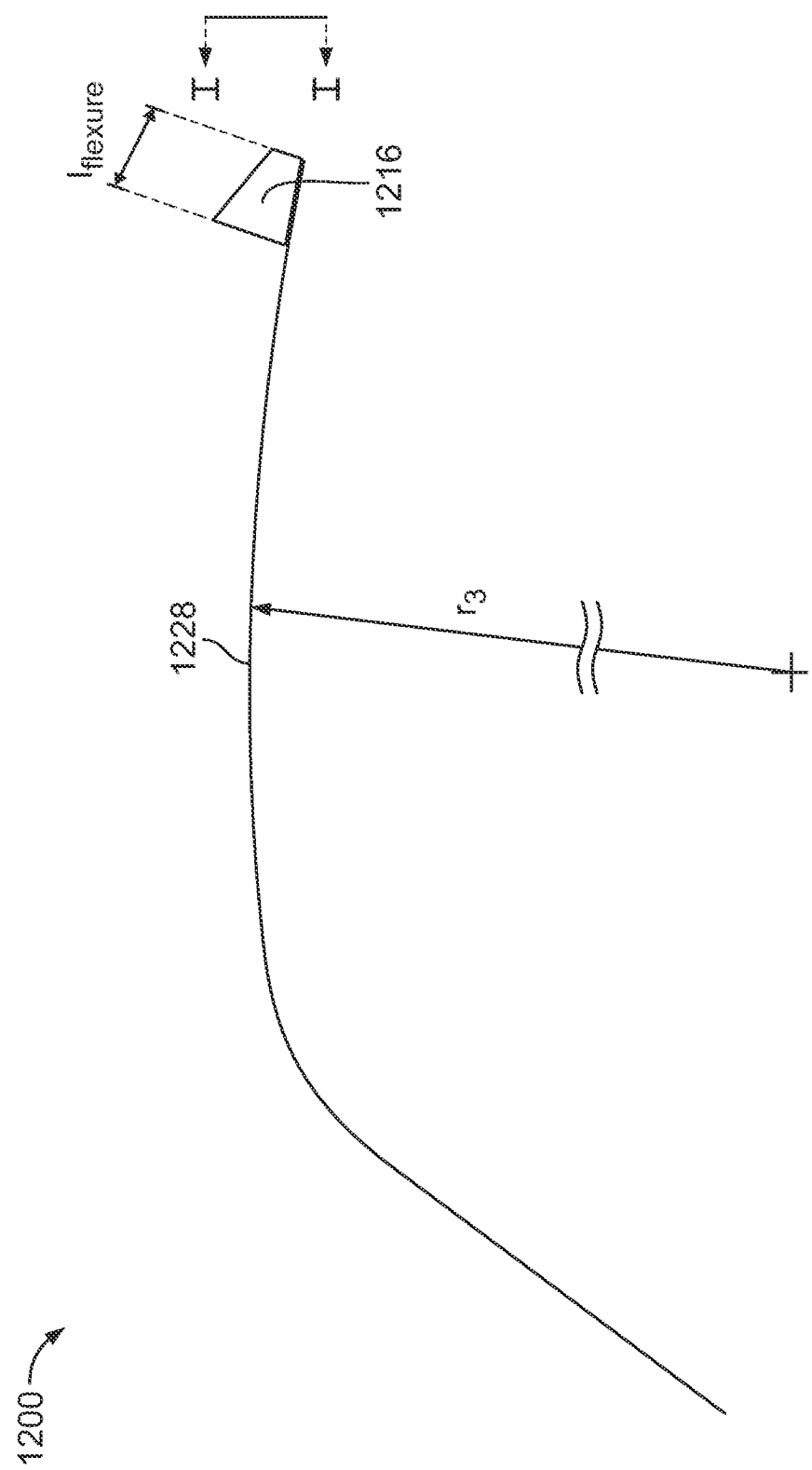
FIG. 12 is another embodiment of a spoke for a non-pneumatic tire.
Figure 12A:
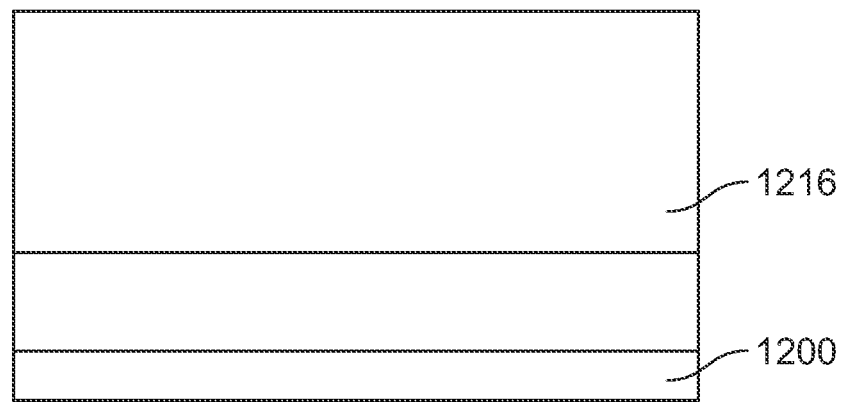
FIG. 12a is an end view of the spoke of FIG. 12 along I-I.

FIGS. 12 and 12a show another embodiment of a spoke 1200. The spoke 1200 of FIGS. 12 and 12a is substantially the same as the spoke 200 in FIGS. 1-10, except for the differences described herein. Accordingly, like features will be identified by like numerals increased by a factor of "1000." In the spoke 200 shown in FIGS. 1-10, the second connecting portion 228 is linear. In comparison, the spoke 1200 of FIGS. 12 and 12a has a curved second connecting portion 1228 with a radius of curvature $r_3$. In comparison to a linear second connecting portion, the curved second connecting portion 1228 in the spoke 1200 of FIGS. 12 and 12a significantly enhances self-supporting behavior. According to one example embodiment, the radius of curvature $r_3$ is 10-50 inches (25-127 cm).

In addition to the design parameters and resultant changes in performance characteristics discussed above in regard to the spoke 200 shown in FIGS. 1-10, the radius of curvature $r_3$ of the curved second connecting portion 1228 in the spoke 1200 of FIGS. 12 and 12a can be varied to affect performance. The radius of curvature $r_3$ of the curved second connecting portion 1228 and a length $l_{flexure}$ of the flexure member 1216 interact to affect self-supporting performance. A smaller radius of curvature $r_3$ of the curved second connecting portion 1228 decreases self-supporting, thus increasing stress during high impact events. A larger radius of curvature $r_3$ of the curved second connecting portion 1228 increases self-supporting, thus decreasing stress during high impact events. This decrease in stress, however, occurs only up to a point. As the radius of curvature $r_3$ increases (the limit being the radius of curvature $r_3$ equal to infinity, resulting in a straight second connecting portion), the effectiveness of the self-supporting begins to once again decrease.

The length $l_{flexure}$ of the flexure member 1216 affects its ability to exert torque at the end of the spoke 1200. This torque acts to straighten the curved second connecting portion 1228 as the tire rolls under a normal load or experiences a high impact event. Consequently, it has been found that a curved second connecting portion 1228 with a smaller radius of curvature $r_3$ is optimally matched with a flexure member 1216 having a longer length $l_{flexure}$, while a curved second connecting portion 1228 with a larger radius of curvature $r_3$ is optimally matched with a flexure member 1216 having a shorter length $l_{flexure}$. The ability of the flexure member 1216 to exert torque on the spoke 1200 is, in addition to the length $l_{flexure}$ of the flexure member 1216, affected by the stiffness of the material used to manufacture the flexure member 1216. Consequently, it is desirable to provide a flexure member 1216 with a longer length $l_{flexure}$ when a softer material is used, and to provide a flexure member 1216 with a shorter length $l_{flexure}$ when a stiffer material is used.

The non-pneumatic tire described herein improves the robustness of the non-pneumatic tire by providing an arrangement where adjacent spokes contact one another during a high impact event. The contact between adjacent spokes results in multiple spokes sharing a load, thus significantly reducing the stress experienced by any single spoke in the non-pneumatic tire. Thus, the durability of the non-pneumatic tire is improved.

In the above described embodiment, the foot portion 214 of the spoke 200 is initially substantially straight, and is bonded to the curved external surface 24 of the lower ring 20. This bonding process forces the foot portion 214 to adapt to the curvature of the external surface 24. While this arrangement results in a relatively simple manufacturing process for the spoke 200 and the lower ring 20, it may give rise to other potential design difficulties. For example, in the flat foot portion embodiment, the primary application force acting on the bond between the spoke and the ring is a tensile force. This tensile force may cause a cleavage type failure at a leading edge of the spoke. As another example, the rotational position of each spoke relative to the lower ring and the upper ring cannot be adjusted without undesirably introducing pre-stresses into the spoke.

Rotational adjustment of the spokes may be necessary to account for manufacturing tolerances. Ideally, every spoke of the non-pneumatic tire would be identical, including the dimensions of various elements (e.g., lengths of foot portion, first connecting portion, and second connecting portion) and also the angles between those elements (e.g., angle between the foot portion and the first connecting portion or between the first and second connecting portions). In practice, however, it is unlikely that every spoke will be identical. Manufacturing guidelines acknowledge variables within formed features of a product, such as material thickness and temper tolerances. Additionally, these manufacturing guidelines acknowledge variables within angular tolerances on bends, with one guideline suggesting a tolerance of +/– one degree.

Figure 13:
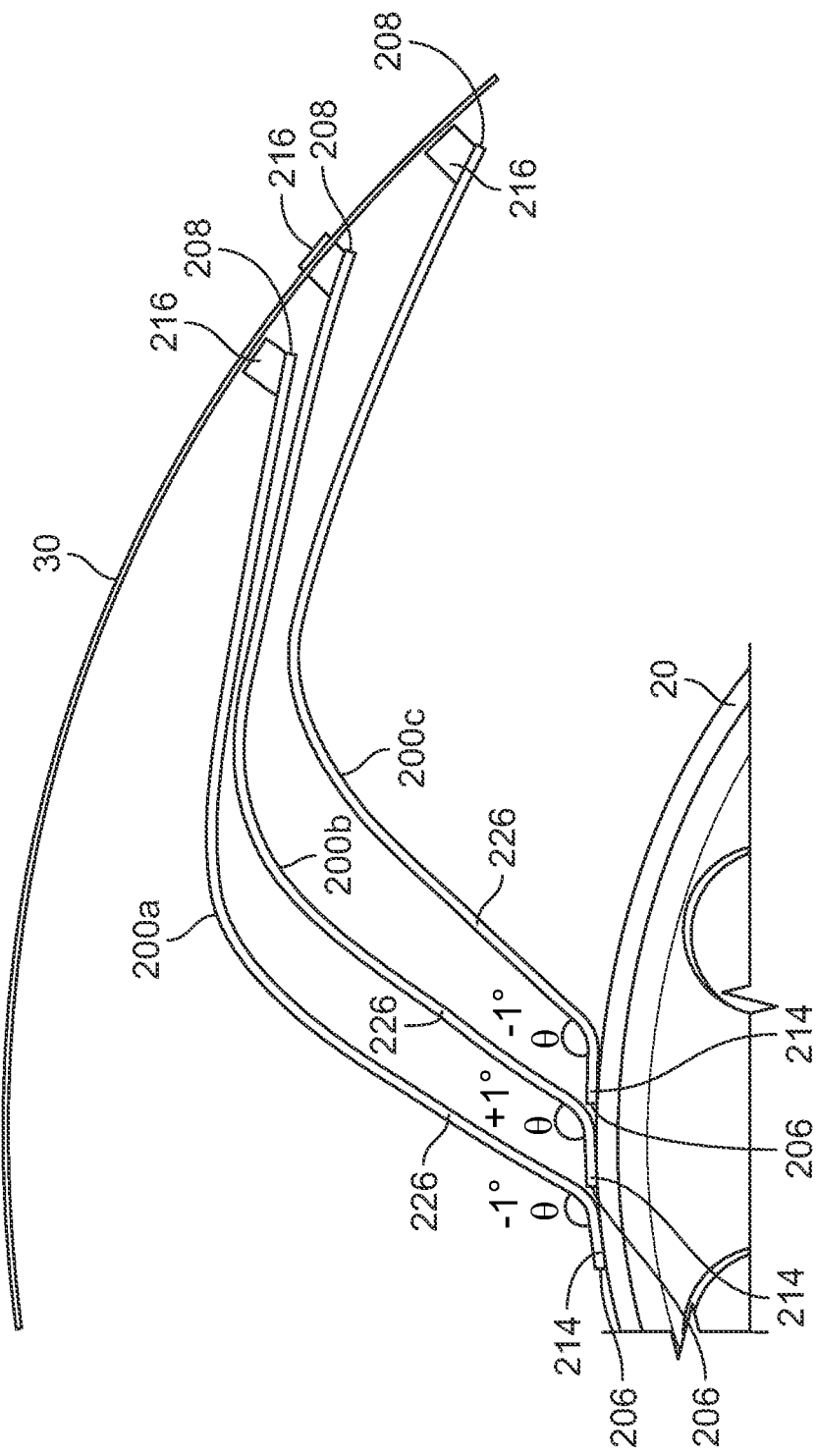
FIG. 13 is a side view of a non-pneumatic tire showing the effect of manufacturing tolerances in spokes before a second end of the spokes are attached to an upper ring.
Figure 14:
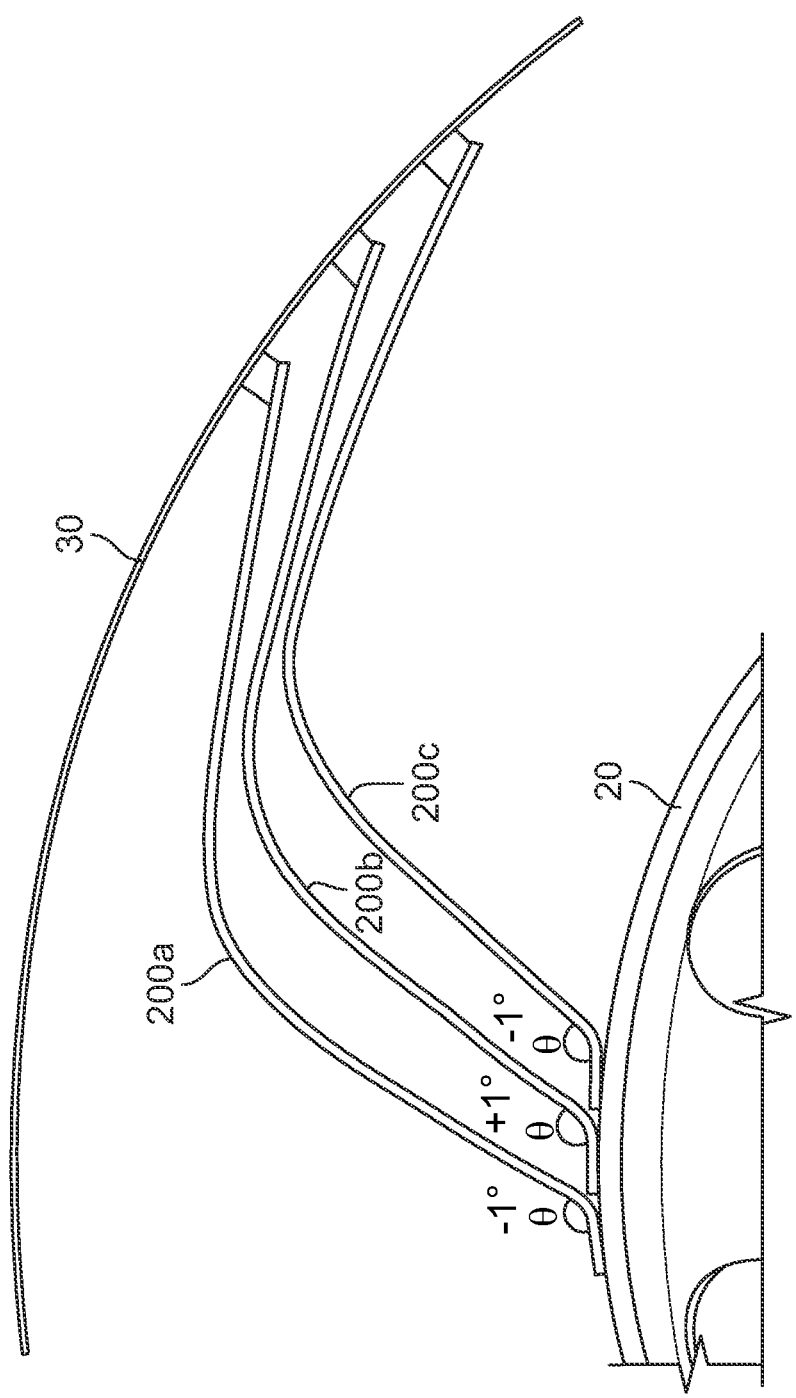
FIG. 14 is a side view of the non-pneumatic tire of FIG. 13 after the second end of the spokes are attached to the upper ring.

FIGS. 13 and 14 illustrates how this +/– one degree tolerance can affect the support structure of a non-pneumatic tire. The non-pneumatic tire of FIGS. 13 and 14 is constructed in accordance with the non-pneumatic tire embodiment of FIGS. 1-6. Accordingly, like features will be identified by like numerals.

FIGS. 13 and 14 show a first spoke 200a, a second spoke 200b, and a third spoke 200c. In the first spoke 200a and the third spoke 200c, an angle θ between the foot portion 214 and the first connecting portion 226 is one degree less than the specified design value, while in the second spoke 200b this angle θ is one degree greater than the design value. FIG. 13 shows the spokes 200 when the foot portion 214 is connected to the lower ring 20 and the second end 208 of each spoke 200 is in a natural or resting position (i.e., the location of the second end 208 of the spoke 200 without the application of any external forces and before the flexure member 216 is attached to the upper ring 30). FIG. 14 shows the spokes 200 after the second end 208 of the spoke 20 has been moved to a desired location and the flexure member 216 is attached to the upper ring 30. As shown in FIG. 13, having the angle between the foot portion 214 and the first connecting portion 226 out of specification by a single degree can cause various issues, including having the flexure member 216 naturally resting above the upper ring 30 (second spoke 200b) or below the upper ring 30 (first and third spokes 200a, 200c), and having irregular spacing between adjacent spokes 200. Some of these issues can be corrected by forcing the second end 208 of each spoke 200 into a desired position, as shown in FIG. 14, but doing so undesirably introduces pre-stresses into the spokes 200. In theory, each spoke 200 could be rotated about its first end 206 to correct these issues. Practically speaking, however, such rotation is not possible due to the geometries between the flat foot portion 214 and the external surface of the lower ring 20.

Figure 15:
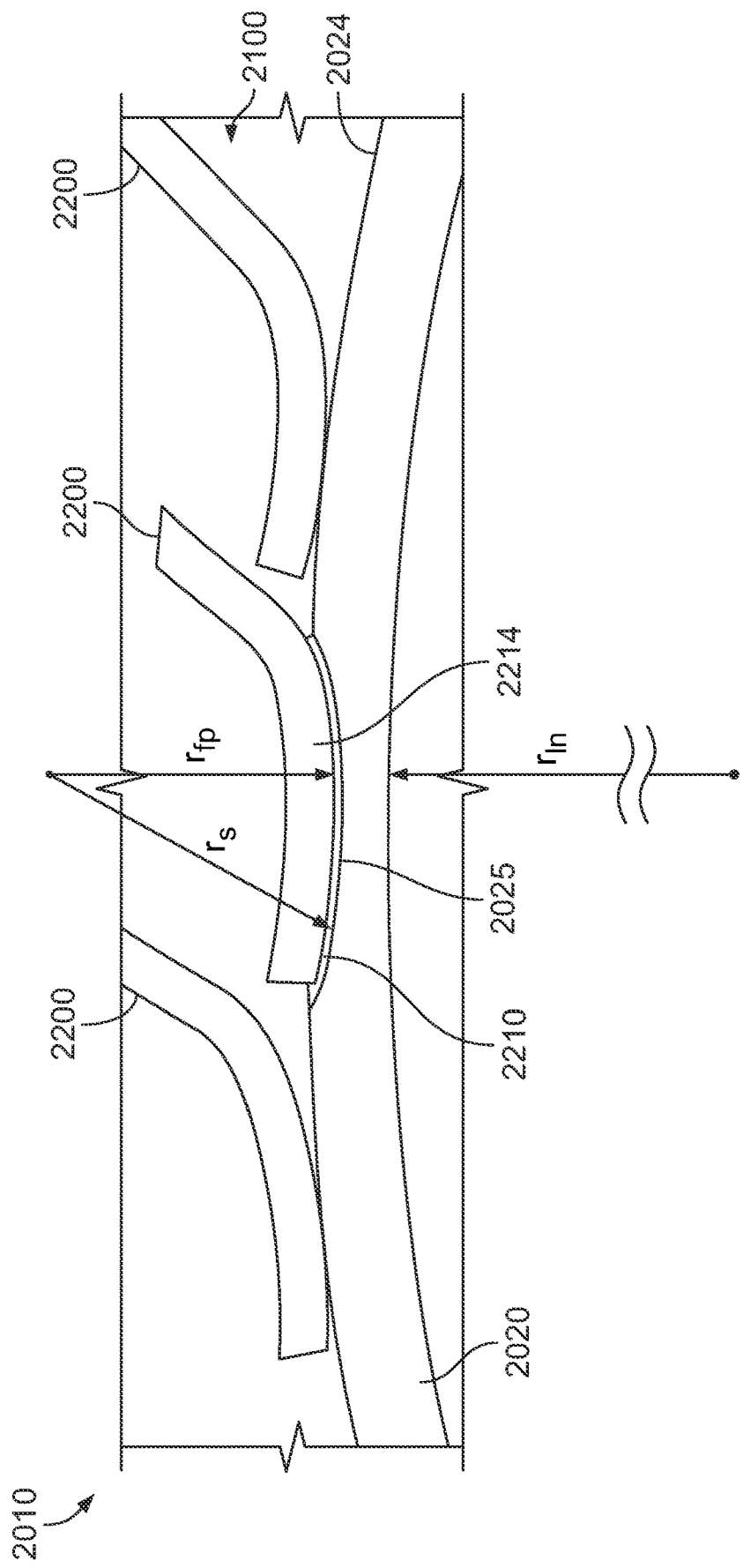
FIG. 15 is a partial view of another embodiment of a non-pneumatic tire.
Figure 16:
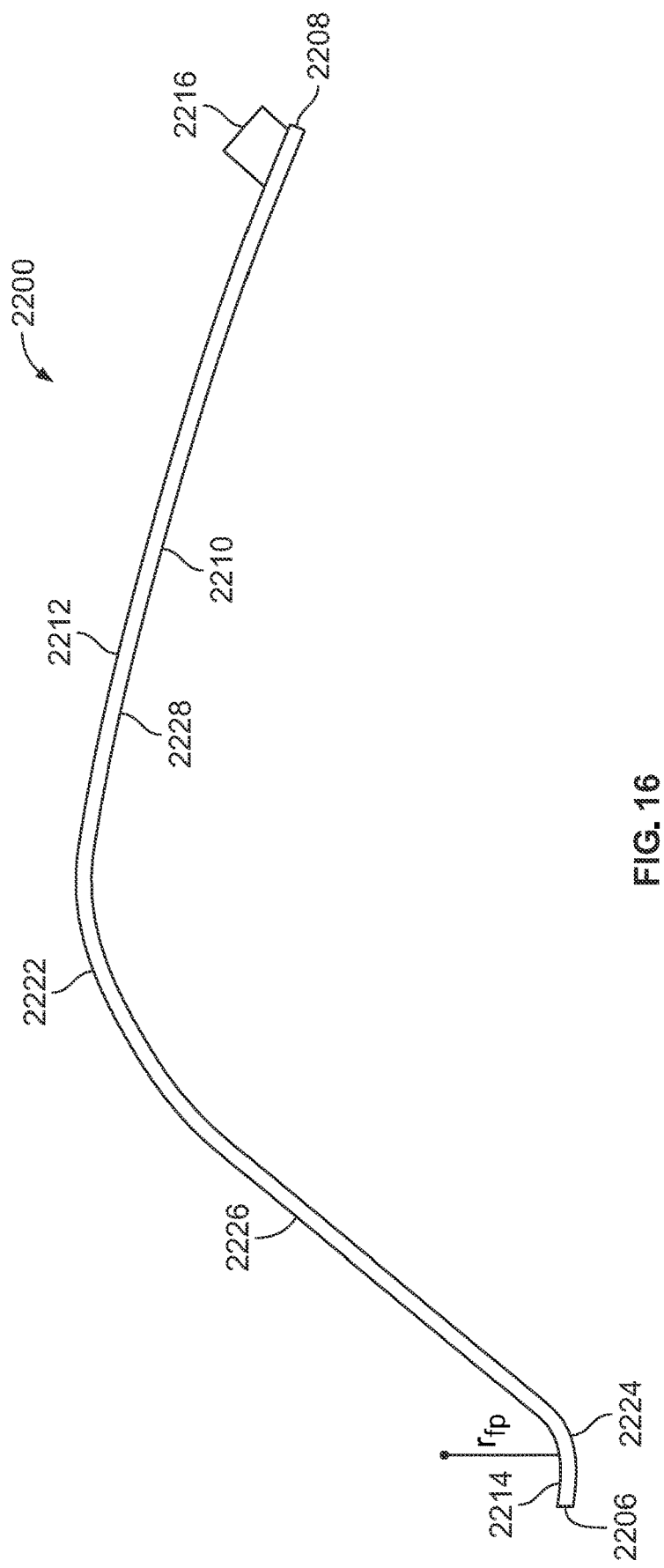
FIG. 16 is a detail view of a single spoke that is used in the non-pneumatic tire of FIG. 15.

FIG. 15 shows an alternative embodiment of part of a non-pneumatic tire having features that alleviate the above-identified issues regarding manufacturing tolerances. FIG. 16 shows a single spoke of the non-pneumatic tire of FIG. 15. The arrangement shown in FIGS. 15 and 16 is substantially similar to the arrangement shown in FIGS. 1-6, except for any differences described herein. Accordingly, like features will be identified by like numerals increased by a value of "2000."

The non-pneumatic tire 2010 includes support structure 2100 that connects a lower ring 2020 to an upper ring (not shown). The support structure 2100 is made up of a plurality of spokes 2200 that are arranged into a first and second spoke group (not shown). The first spoke group and the second spoke group are offset and spaced apart from one another in the axial direction of the non-pneumatic tire 2010.

Referring to FIG. 16, each spoke 2200 extends between a first end 2206 and a second end 2208, and includes a first surface 2210 and a second surface 2212. A foot portion 2214 is provided toward the first end 2206 of the spoke 2200. A flexure member 2216 is provided at the second end 2208 of the spoke 2200. A knee portion 2222 is provided between the first end 2206 and the second end 2208. A transition portion 2224 is provided between the knee portion 2222 and the first end 2206. The foot portion 2214 extends from the transition portion 2224 toward the first end 2206 of the spoke 2200. A first connecting portion 2226 connects the transition portion 2224 to the knee portion 2222, and a second connecting portion 2228 connects the knee portion 2222 to the second end 2208 of the spoke 2200.

The external surface 2024 of the lower ring 2020 is provided with a plurality of scallops 2025 (only a single scallop shown in FIG. 15) that are equal in number to the total number of spokes 2200 in the support structure. 2100. The first surface 2210 of the spoke 2200 at the foot portion 2214 is curved and has a radius of curvature $r_{fp}$ that is equal to a radius of curvature $r_s$ of a corresponding scallop 2025. The scallops 2025 are spaced apart from one another along a circumferential direction of the non-pneumatic tire 2010, and are arranged into first and second scallop groups (not shown). Like the separation between the first and second spoke groups, the scallop groups are also offset and spaced apart from one another in the axial direction of the non-pneumatic tire 2010. The curved first surface 2210 of the spoke 2200 at the foot portion 2214 is bonded to a respective scallop 2025 to attach the first end of the spoke 2200 to the lower ring 2020. The flexure member 2216 is bonded to the upper ring to connect the second end 2208 of the spoke 2200 to the upper ring 2030. In alternative embodiments, the foot portion or the flexure member may be attached to the scallop or upper ring, respectively, using any desired arrangement. For example, the curved first surface of the spoke at the foot portion may be attached to a respective scallop using a nut and bolt arrangement, whereby the bolt extends into through holes provided on the spoke and the lower ring, exposing a threaded portion that receives the nut. This nut and bolt attachment may also be used to attach the flexure member to the upper ring. In other alternative embodiments, instead of separate scallop groups, each scallop may extend continuously across the lower ring in the axial direction and the spokes of the first and second spoke group may share a respective scallop.

The above-described arrangement helps resolve the potential design issues associated with the flat foot portion spoke embodiment in regard to spoke manufacturing tolerances. Providing the non-pneumatic tire 2010 with spokes 2200 having a curved foot portion 2214 and a corresponding curved scallop 2205 on the lower ring 2020 makes the primary application force acting on the bond between the spoke 2200 and the lower ring 2020 a shear force, rather than the tensile force found in the flat foot portion embodiment. This change reduces the possibility of a cleavage type failure mode occurring at the connection between the spoke 2200 and the lower ring 2020. Furthermore, the shear force acting on the bond between the spoke 2200 and the lower ring 2020 puts the bond into a substantially stronger failure mode for the most commonly used adhesives.

Additionally, the curved surfaces of the spoke 2200 and the scallop 2025 allow for the adjustment of the rotational position of each spoke 2200 relative to the lower ring 2020 and the upper ring 2030 without pre-inducing stresses into the spoke as would be the case for the flat foot portion embodiment. The curved surfaces of the spoke 2200 and the scallop 2025 also allow a constant adhesive gap to be maintained during such rotational position adjustment.

It has been found that the radius of curvature $r_{fp}$ at the foot portion 2214 and the radius of curvature $r_s$ of the scallop 2025 should conform to certain design principles in order to provide the above described flexibility regarding rotational position adjustment. According to one example design principle, the radius of curvature $r_{fp}$ at the foot portion 2214 and the radius of curvature $r_s$ of the scallop 2025 is different from a radius of curvature $r_{lr}$ of the external surface of the lower ring 2020.

In the illustrated embodiment, the curved second surface 2212 of the spoke 2200 at the foot portion 2214 and the scallop 2025 are both convex relative to an inner surface 2023 of the lower ring 2020, and the radius of curvature $r_{fp}$ at the foot portion 2214 and the radius of curvature $r_s$ of the scallop 2025 are both constant and equal to one another. Additionally, the scallops 2025 are formed directly on the lower ring 2020. In alternative embodiments, the second surface of the spoke may be convex relative to the inner surface of the spoke and the lower ring may be provided with corresponding bumps that are also convex relative to the inner surface of the spoke. In other alternative embodiments, the radius of curvature at the foot portion or the radius of curvature of the scallop or bump may be variable or different from one another. In still other alternative embodiments, the scallops or bumps may be formed on a sleeve that is secured to the external surface of the lower ring.

Figure 17:
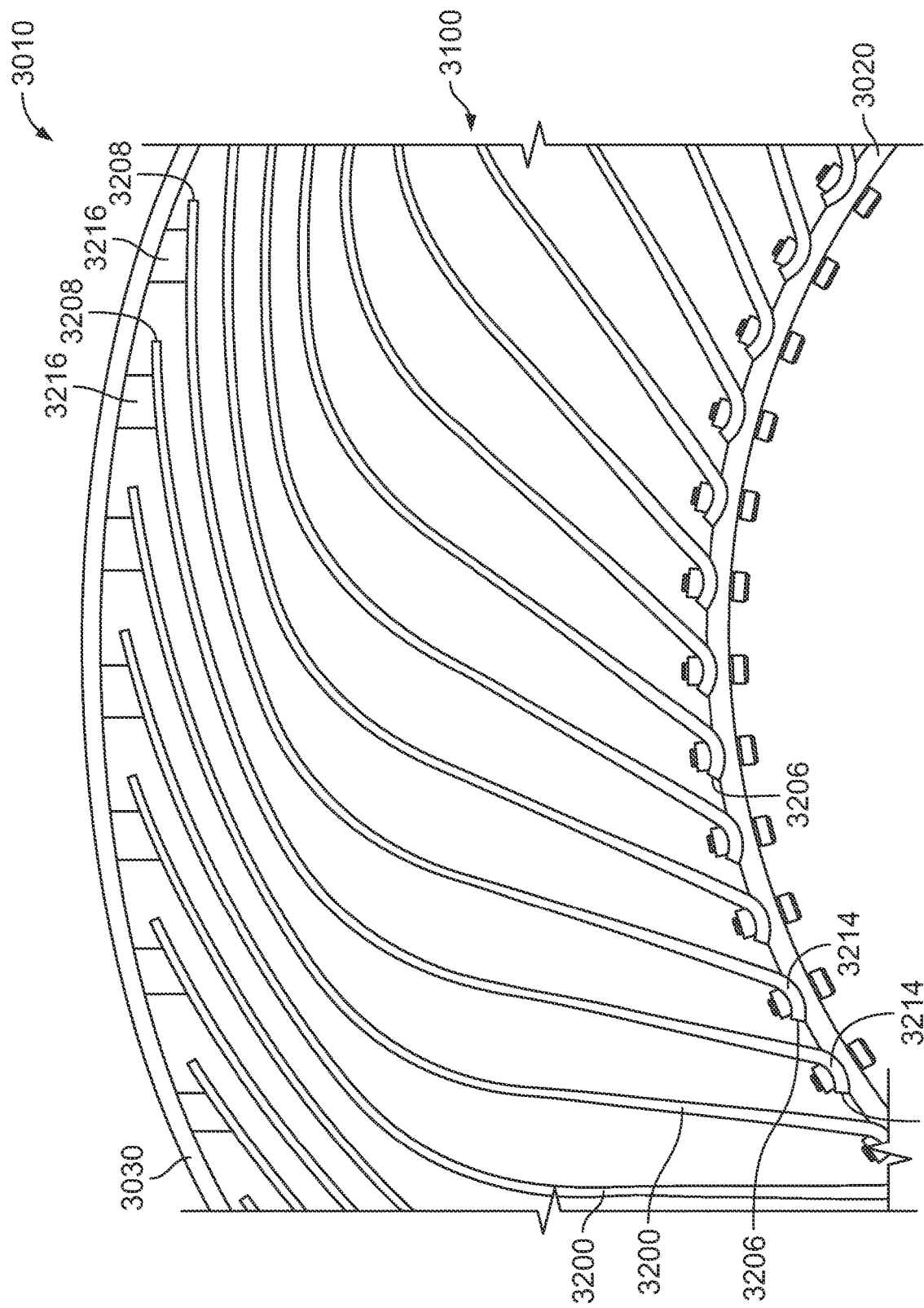
FIG. 17 is a partial side view of another embodiment of a non-pneumatic tire.
Figure 18:
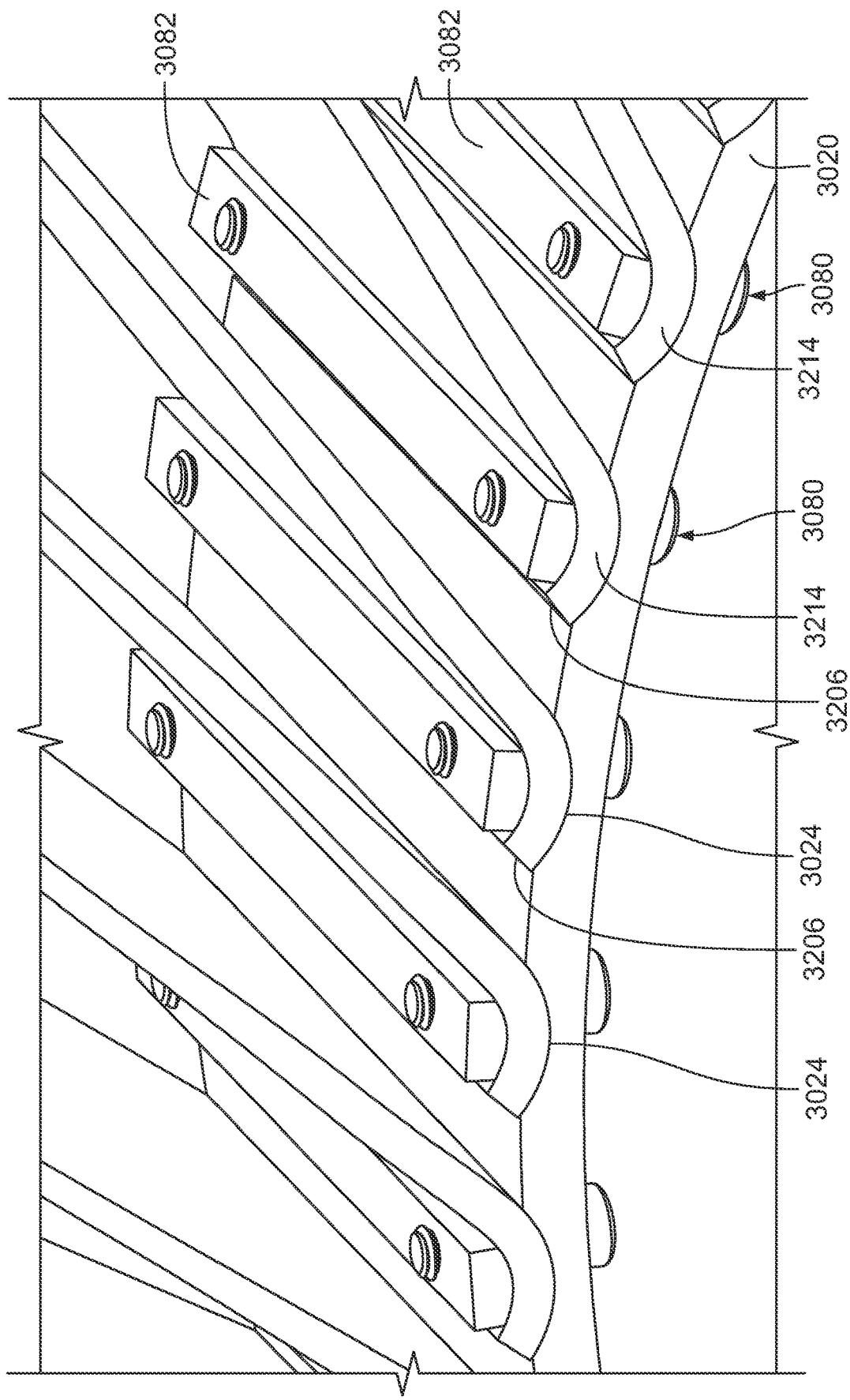
FIG. 18 is a partial perspective view of the non-pneumatic tire of FIG. 17.
Figure 19:
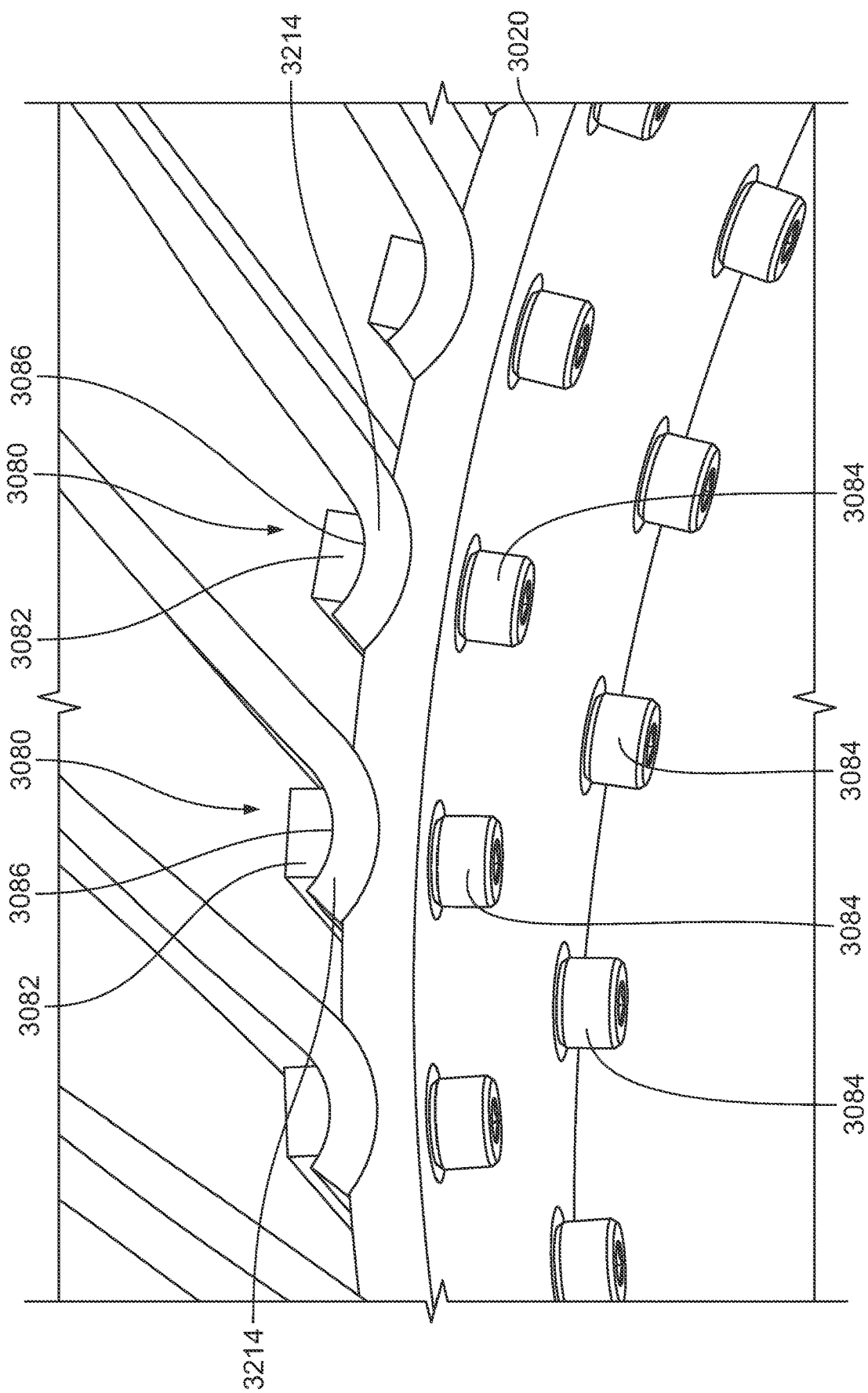
FIG. 19 is another partial perspective view of the non-pneumatic tire of FIG. 17.

FIGS. 17-19 show another embodiment of a non-pneumatic tire 3010. The non-pneumatic tire 3010 of FIGS. 17-19 is substantially the same as the non-pneumatic tire 2010 of FIGS. 15 and 16 except for the differences described herein. Accordingly, like features will be identified by like numerals increased by a factor of "1000."

The non-pneumatic tire 3010 includes support structure 3100 that connects a lower ring 3020 to an upper ring 3030. The support structure 3100 is made up of a plurality of spokes 3200 that are arranged into a first spoke group and a second spoke group (not shown). In the illustrated embodiment, for the sake of clarity, only a single row of spokes 3200 is shown, and the spokes 3200 extend the full axial width of the lower ring 3020. When two spoke groups are utilized, however, the lower ring 3020 may have an axial width that is at least twice the width of a single spoke.

Each spoke 3200 extends between a first end 3206 and a second end 3208. A foot portion 3214 is provided toward the first end 3206 of the spoke 3200. A flexure member 3216 is provided at the second end 3208 of the spoke 3200.

The lower ring 3020 is provided with a plurality of scallops 3024 that are equal in number to the total number of spokes 3200 in the support structure 3100. The scallops 3024 are spaced apart from one another along a circumferential direction of the non-pneumatic tire 3010 and are arranged into first and second scallop groups (not shown). Like the separation between the first and second spoke groups, the scallop groups are also offset and spaced apart from one another in the axial direction of the non-pneumatic tire 3010. In alternative embodiments, each scallop may extend continuously across the lower ring in the axial direction and the spokes of the first and second spoke group may share a respective scallop.

A mechanical fastening arrangement 3080 connects the foot portion 3214 of the spoke 3200 to a respective scallop 3205 to attach the first end 3206 of the spoke 3200 to the lower ring 3020. An adhesive (not shown) may augment the connection by bonding these components together. The adhesive may prevent wear between the various components due to cyclic loading and may also prevent degradation (e.g., corrosion) resulting from exposure to environmental elements. The flexure member 3216 is attached to the upper ring 3030 to connect the second end 3208 of the spoke 3200 to the upper ring 3030.

In the illustrated embodiment, the mechanical fastening arrangement 3080 includes a clamp plate 3082 and two socket head cap screws 3084. The clamp plate 3082 has an axial width that is substantially the same as the foot portion 3214, and a face 3086 with a radius of curvature that is substantially the same as the radius of curvature of the foot portion 3214. In alternative embodiments, the axial width of the clamp plate may be greater than or less than the axial width of the foot portion. In other alternative embodiments, the radius of curvature of the face of the clamp plate may be different than the radius of curvature of the foot portion.

Each mechanical fastening arrangement 3080 is configured so that the head of the socket head cap screw 3084 is located radially inward of the lower ring 3020, and the threaded portion of the socket head cap screw 3084 extends through the lower ring 3020, the foot portion 3214, and the clamp plate 3082. The foot portion 3214 is provided with thru-holes (not shown) to allow passage of the socket head cap screw 3084. The thru-holes may be oversized or provided as slots to allow for adjustment of the position of the spoke 3200 relative to the lower ring 3020.

The threaded portion of the socket head cap screw 3084 engages with internal threads provided on the clamp plate 3082, and the clamp plate 3082 is located radially outward of the foot portion 3214. In alternative embodiments, the orientation of the fastening arrangement may be reversed so that the head of the socket head cap screw is located radially outward of the clamp plate and the threaded portion engages with internal threads provided on the lower ring. In other alternative embodiments, the socket head cap screws may be provided in any desired location, may be any desired size, and there could be a greater or fewer number of screws. In still other alternative embodiments, the mechanical fastening arrangement, the lower ring, and/or the foot may be dimensioned and configured so that the second fastener does not extend through the lower ring or clamp plate. In still yet other alternative embodiments, any desired mechanical fastening arrangement may be used (e.g., studs or set screws in conjunction with nuts and washers, rivets).

The mechanical fastening arrangement 3080 distributes loads across the axial width of the foot portion 3214 of the spoke 3200, thereby providing a more robust structure and may also provide a more rigid connection. Furthermore, the use of the clamp plate 3082 may facilitate construction of the non-pneumatic tire 3010 by eliminating the need for a clamping arrangement when only adhesives are used. Additionally, the mechanical fastening arrangement 3080 allows for the individual removal, maintenance, and installation of a single spoke.

Figure 20:
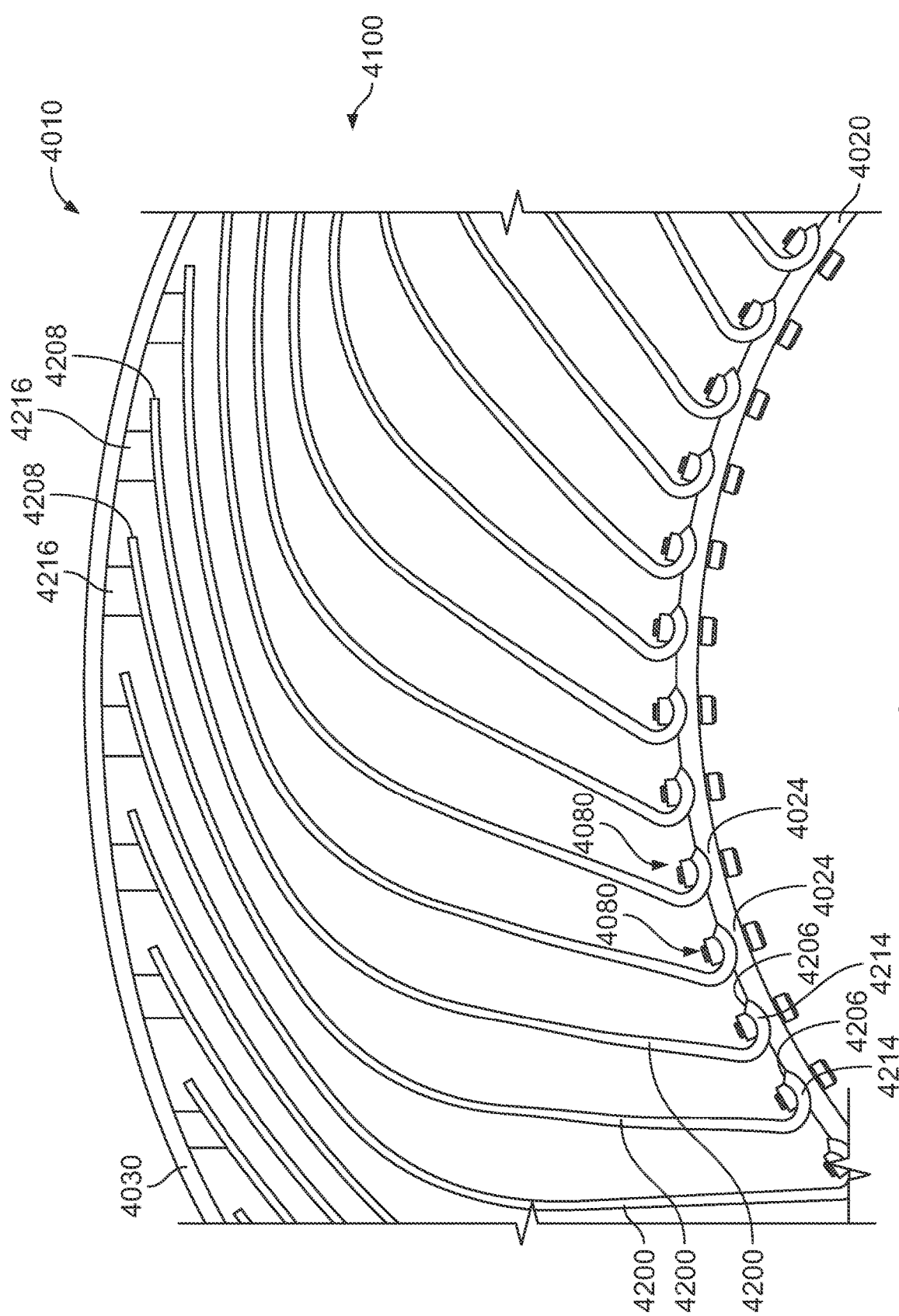
FIG. 20 is a partial side view of yet another embodiment of a non-pneumatic tire.
Figure 21:
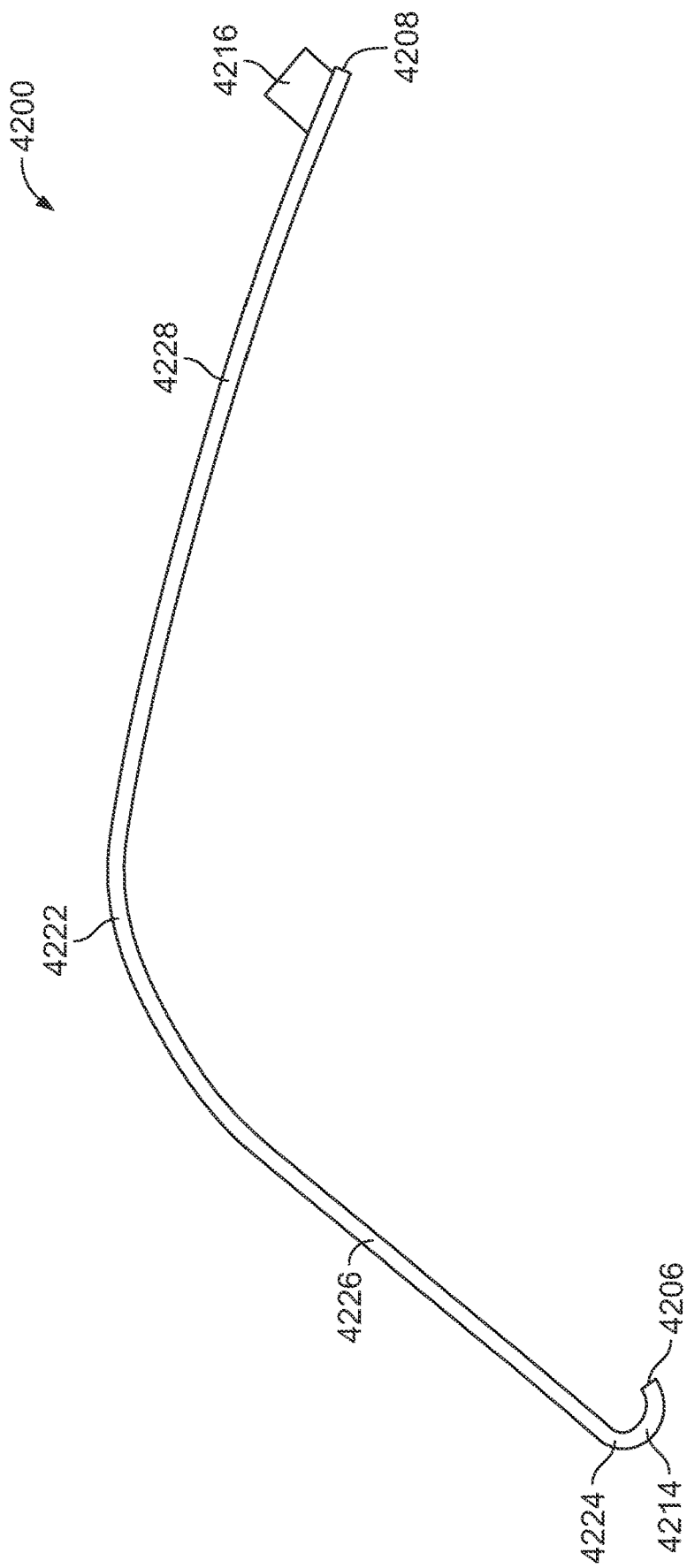
FIG. 21 is a detail view of a single spoke from the non-pneumatic tire of FIG. 20.

FIGS. 20 and 21 show another embodiment of a non-pneumatic tire 4010. The non-pneumatic tire 4010 of FIGS. 20 and 21 is substantially the same as the non-pneumatic tire 3010 of FIGS. 17-19 except for the differences described herein. Accordingly, like features will be identified by like numerals increased by a factor of "1000."

The non-pneumatic tire 4010 includes support structure 4100 that connects a lower ring 4020 to an upper ring 4030. The support structure 4100 is made up of a plurality of spokes 4200 that are arranged into a first spoke group and a second spoke group (not shown).

Each spoke 4200 extends between a first end 4206 and a second end 4208. A foot portion 4214 is provided toward the first end 4206 of the spoke 4200. A flexure member 4216 is provided at the second end 4208 of the spoke 4200. A knee portion 4222 is provided between the first end 4206 and the second end 4208. A transition portion 4224 is provided between the knee portion 4222 and the first end 4206. The foot portion 4214 extends from the transition portion 4224 toward the first end 4206 of the spoke 4200. A first connecting portion 4226 connects the transition portion 4224 to the knee portion 4222, and a second connecting portion 4228 connects the knee portion 4222 to the second end 4208 of the spoke 4200.

The lower ring 4020 is provided with a plurality of scallops 4024 that are equal in number to the total number of spokes 4200 in the support structure 4100. The scallops 4024 are spaced apart from one another along a circumferential direction of the non-pneumatic tire 4010 and are arranged into first and second scallop groups (not shown). Like the separation between the first and second spoke groups, the scallop groups are also offset and spaced apart from one another in the axial direction of the non-pneumatic tire 4410. In alternative embodiments, each scallop may extend continuously across the lower ring in the axial direction and the spokes of the first and second spoke group may share a respective scallop.

A mechanical fastening arrangement 4080 connects the foot portion 4214 of the spoke 4200 to a respective scallop 4205 to attach the first end 4206 of the spoke 4200 to the lower ring 4020. The mechanical fastening arrangement 4080 is substantially the same as the mechanical fastening arrangement 3080 shown in FIGS. 17-19 and will therefore not be described further. An adhesive (not shown) may augment the connection by bonding these components together. The adhesive may prevent wear between the various components due to cyclic loading and may also prevent degradation (e.g., corrosion) resulting from exposure to environmental elements. The flexure member 4216 is attached to the upper ring 4030 to connect the second end 4208 of the spoke 4200 to the upper ring 4030.

As discussed above, in the embodiments of FIGS. 1-19, relative to a single spoke the knee portion and the transition portion are concavely curved in opposite facing directions. In comparison, according to the embodiment of FIGS. 20 and 21, the knee portion 4222 and the transition portion 4224 are concavely curved in the same direction. This arrangement may provide benefits regarding how the mechanical fastening arrangement 4080 and adhesives (if used) are loaded and stressed. In particular, providing the knee portion 4222 and the transition portion 4224 to be concavely curved in the same direction may generate compressive effects between the spoke 4200 and the lower ring 4020, which may reduce peeling issues and better distribute stresses thereby providing a more robust structure.

While discrete embodiments and variants have been shown and described in FIGS. 1-21, the disclosed features not exclusive to each described embodiment. Instead, various features can be combined between the embodiments as desired. For example, the arrangement of the spokes curved foot portions shown in FIGS. 15 and 16 may be combined with the curved connecting portion of the spoke shown in FIGS. 12 and 12a.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. For example, each spoke may be provided with a rubber coating to soften impact when contact between adjacent spokes occurs. Accordingly, departures may be made from such details without departing from the spirit or scope of the applicant's general inventive concept.

What is claimed is:

1. A non-pneumatic tire comprising:
   a lower ring provided with a plurality of scallops, each one of the plurality of scallops having a first curved surface;
   an upper ring that is substantially coaxial with the lower ring; and
   a support structure connecting the lower ring to the upper ring, the support structure being made up of a plurality of spokes, the plurality of spokes being arranged into a first spoke group and a second spoke group that is axially spaced from the first spoke group, each one of the plurality of spokes comprising:
   a first end connected to the lower ring;
   a second end connected to the upper ring;
   a first surface and a second surface facing opposite the first surface, each one of the first surface and the second surface extending between the first end and the second end; and
   a foot portion provided toward the first end of the spoke, the first surface of the spoke at the foot portion being a second curved surface, the second curved surface being attached to the first curved surface of one of the plurality of scallops to connect the first end of the spoke to the lower ring;
   wherein the non-pneumatic tire is configured to allow for the adjustment of a rotational position of each one of the plurality of spokes relative to the lower ring and the upper ring without pre-inducing stresses into each one of the plurality of spokes; and
   wherein the second surface of the spoke at the foot portion is concave and positioned to face the upper ring.

2. The non-pneumatic tire of claim 1, wherein each one of the first curved surface and the second curved surface is convex.

3. The non-pneumatic tire of claim 1, wherein the first curved surface has a first radius of curvature and the second curved surface has a second radius of curvature, and wherein at least one of the first radius of curvature and the second radius of curvature is constant.

4. The non-pneumatic tire of claim 1, wherein the first curved surface has a first radius of curvature and the second curved surface has a second radius of curvature, and wherein the first radius of curvature is equal to the second radius of curvature.

5. The non-pneumatic tire of claim 1, wherein the first curved surface has a first radius of curvature, the second curved surface has a second radius of curvature, and an external surface of the lower ring has a third radius of curvature, and wherein each one of the first radius of curvature and the second radius of curvature is different from the third radius of curvature.

6. The non-pneumatic tire of claim 1, wherein the spokes of the first spoke group are concavely curved relative to a first circumferential direction of the tire, and the spokes of the second spoke group are convexly curved relative to the first circumferential direction of the tire.

7. The non-pneumatic tire of claim 1, wherein each one of the plurality of spokes comprises:
 a knee portion located between the first end and the second end; and
 a transition portion located between the first end and the knee portion;
 wherein the knee portion and the transition portion are concavely curved in opposite facing directions.

8. The non-pneumatic tire of claim 1, wherein each one of the plurality of spokes comprises:
 a knee portion located between the first end and the second end; and
 a transition portion located between the first end and the knee portion;
 wherein the knee portion and the transition portion and concavely curved in the same direction.

9. The non-pneumatic tire of claim 1, wherein each one of the plurality of spokes further comprises a flexure member, the flexure member being attached to the spoke and the upper ring to connect the second end of the spoke to the upper ring.

10. The non-pneumatic tire of claim 1, wherein the non-pneumatic tire is arranged and configured so that adjacent spokes of the plurality of spokes do not contact one another when the non-pneumatic tire is in a first condition, and so that the adjacent spokes of the plurality of spokes contact one another when the non-pneumatic tire is in a second condition, the first condition being when the tire rolls on a flat surface, the second condition being different from the first condition.

* * * * *